(12) United States Patent
Eguchi

(10) Patent No.: US 7,591,931 B2
(45) Date of Patent: Sep. 22, 2009

(54) WATER STERILIZING APPARATUS, WATER STERILIZING METHOD, METAL ION ELUATE PRODUCING METHOD AND METAL ION ELUATE

(76) Inventor: Hideo Eguchi, 339, Yoshikawa-cho 2-chome, Obu-shi (JP) 474-0046

( * ) Notice: Subject to any disclaimer, the term of this patent is extended or adjusted under 35 U.S.C. 154(b) by 513 days.

(21) Appl. No.: 11/394,301

(22) Filed: Mar. 30, 2006

(65) Prior Publication Data
US 2006/0163170 A1 Jul. 27, 2006

Related U.S. Application Data

(63) Continuation of application No. PCT/JP2004/014004, filed on Sep. 16, 2004.

(30) Foreign Application Priority Data
Oct. 3, 2003 (JP) .............................. 2003-346361

(51) Int. Cl.
*C02F 1/461* (2006.01)
*C02F 1/467* (2006.01)

(52) U.S. Cl. ................... 204/242; 204/273; 204/275.1; 210/512.3; 210/748

(58) Field of Classification Search .................. 205/754, 205/348, 545, 767
See application file for complete search history.

(56) References Cited

FOREIGN PATENT DOCUMENTS

| JP | 40-15093 | 7/1965 |
|----|----------|--------|
| JP | 47-34197 | 11/1972 |
| JP | 63-126099 U | 8/1988 |
| JP | 09-187773 | 7/1997 |

OTHER PUBLICATIONS

International Search Report dated Jan. 11, 2005.
PCT Written Opinion of the International Searching Authority dated Jan. 11, 2005.

*Primary Examiner*—Harry D Wilkins, III
(74) *Attorney, Agent, or Firm*—Yokoi & Co., U.S.A., Inc.; Peter Ganjian

(57) ABSTRACT

Silver ions and the like are efficiently eluted in the water by the action of electrolysis occurring between the silver ion eluting bodies 51a and the like stirred by the stream in each chamber of the electrolytic cell 32a and turned into positive poles in a chamber and the same turned into negative poles in another chamber and the action of contact between the silver ion eluting bodies 51a and the like with the stream of water. And the stirred silver ion eluting bodies 51a and the like remove attachments on their surface by their mutual frictional movements and prevent any decline in the elution effect of silver ions and the like.

17 Claims, 15 Drawing Sheets

WATER STERILIZING APPARATUS, WATER STERILIZING METHOD, METAL ION ELUATE PRODUCING METHOD AND METAL ION ELUATE

CROSS-REFERENCE TO RELATED APPLICATIONS

This application is a continuation of the prior International Application No. PCT/JP2004/014004, with an international filing date of Sep. 16, 2004, which designated the United States, the entire disclosures of which Application are incorporated by reference herein.

BACKGROUND OF THE INVENTION (1) Field of the Invention

The present invention relates to a water sterilizing apparatus, a water sterilizing method, a metal ion eluate producing method and metal ion eluate suitable for use in bath tubs, swimming pools, hot spring resort facilities, water tank, vapor sterilizing apparatus, food processing plants, and other facilities where water sterilization is required.

(2) Description of Related Art

In the past, as technology of this type, inventions relating to water purifying apparatuses having a metal ion generating means for generating metal ions in water or an ultraviolet rays sterilizing apparatus wherein an electrochemical generating apparatus of silver ion having a polarity inverting relay ready to work in a circuit for applying DC on the silver positive pole and the silver negative pole by using the silver ion generating means (for example, see Japanese Patent Application Laid Open Hei 9-187773) has been known.

When a DC voltage is applied on the silver positive pole and the silver negative pole in the electrochemical generating apparatus of silver ion (silver ion generating apparatus) of the above-mentioned water purifying apparatus, silver ions are generated from the silver positive pole, and the silver ions are added to the water that has flowed into the silver ion generating apparatus. The polarity of the positive pole and the negative pole is inverted by the polarity inverting relay at regular intervals to remove the scale that has set on the negative pole and this enables to generate continuously silver ion.

The document mentioned above contains no description that the silver positive pole and the silver negative pole fixed in the silver ion generating apparatus are themselves mobile. And as shown in FIG. 2 of the document, the silver positive pole and the silver negative pole are directly connected with the polarity reversing relay, so it is likely that they are disposed fixedly at predetermined positions within the silver ion generating apparatus. Therefore, the electric poles planted at such predetermined positions are likely to gather scale after a use for a certain period of time resulting in a problem of gradually declining elution effect of silver ion. And the use of a polarity reversing relay for switching the polarity of poles produced only a limited effect of removing scale.

BRIEF SUMMARY OF THE INVENTION

The present invention was made in view of the above-mentioned problem, and its object is to provide a water sterilizing apparatus, a water sterilizing method, a metal ion eluate producing method and metal ion eluate capable of producing over a long period of time metal ion water having a very high eluting effect of metal ion and a high sterilizing action.

In order to achieve the aforementioned object, one aspect of the present invention provides a water sterilizing apparatus comprising a container having an electrolytic cell composed of two chambers not partially separated, an inflow pipe and an outflow pipe connected with the container, a voltage feeding unit, connected with a conductor composed of conductive members provided in each chamber of the electrolytic cell, for feeding the conductor with DC voltage, and metal ion eluting bodies a plurality of which are respectively contained in each chamber of the electrolytic cell for eluting metal ion by causing electrolysis by their continuously mutually frictional movements due to the stirring action of the stream and by their becoming positive poles as they come into contact with the conductor connected with the positive side of the above-mentioned voltage feeding unit in a chamber and their becoming negative poles as they come into contact with the conductor connected with the negative side of the above-mentioned voltage feeding unit in another chamber.

In the present invention structured as described above, when water flowed into the container from the inflow pipe, water begins to circulate in the electrolytic cell. A plurality of metal ion eluting bodies contained in each chamber of the electrolytic cell, being agitated by the stream, enter into contact mutually by the stirring action and elute metal ions in the water while repeating frictional movements. In other words, due to the contact of the surface of metal ion eluting bodies with the stream during the period from the inflow of the stream from the inflow pipe until its outflow from the outflow pipe, metal ion elutes.

The voltage feeding unit connected with the conductor composed of a conductive member provided in each chamber of the electrolytic cell feeds the conductor with DC voltage. Here, each metal ion eluting body enters into contact with the conductor and becomes a positive pole in a chamber wherein the conductor is provided to enter into contact with the positive side of the voltage feeding unit and enters into contact with the conductor and becomes a negative pole in another chamber wherein the conductor is provided to enter into contact with the negative side of the voltage feeding unit. As a result, an electrolysis occurs in the electrolytic cell, and metal ions elute in the water from the positive poles. Between a chamber wherein metal ion eluting bodies serving as the positive poles and another chamber wherein metal ion eluting bodies serving as negative poles, there is a part not separating them. As a result, when the metal ion eluting bodies serving as the positive pole and the metal ion eluting bodies serving as the negative pole approach each other on both sides of the part not separating the two chambers, an electrolysis occurs and metal ions elute.

In this way, the metal ion eluting bodies not only elute metal ions by their contacting action with stream but elute metal ions further by their serving as electrodes for the electrolysis. As a result, highly sterilizing metal ion water in which a sufficient amount of metal ions have eluted is discharged from the outflow pipe.

In addition, metal ion eluting bodies repeat rubbing action of the surface of each other when they are stirred by the stream in the electrolytic cell. In other words, while they are stirred by the stream, they are always removing attachments such as water stain, rust, scale resulting from the crystallization of mineral components of water that have developed on the surface by the action. Therefore, the surface of the metal ion eluting bodies is always kept in contact with water. As a result, both the eluting effect of metal ions by the contacting effect with the stream and the eluting effect of metal ions by electrolysis are kept at a high level.

As described above, according to the present invention, it will be possible to provide a water sterilizing apparatus or a water sterilizing method capable of efficiently eluting metal ions in the water by the electrolytic action and the contact action between metal ion eluting bodies and water streams while removing attachments on the surface of metal ion eluting bodies.

Here, it is preferable that the above-mentioned metal ion eluding bodies are shaped in such a way that they can efficiently contact the surface of each other when they rub each other by the stirring action of the water current. As a result, an optional aspect of the present invention provide the metal ion eluting bodies are cylindrical in the water sterilizing apparatus.

As the metal ion eluting bodies is cylindrical in shape, the metal ion eluting bodies can rub thoroughly the surface of cylinders each other when the stream stirs the metal ion eluting bodies. Therefore, scale and other attachments on the surface can be efficiently removed. According to present invention, it will be possible to efficiently remove attachments on the surface when the metal ion eluting bodies engaged in mutual frictional movements.

As another form suitable for bringing efficiently metal ion eluting bodies in contact with the surface of each other, another optional aspect of the present invention provides spherical metal ion eluding body for the metal ion eluting body in the water sterilizing apparatus.

As the metal ion eluting bodies are spherical, they can rotate in all direction when they are stirred by the stream. As a result, metal ion eluting bodies can rub thoroughly the surface of each other ball, and scale and other attachments on their surface can be efficiently removed. In addition, even if they collide with the internal wall of the electrolytic cell as they are stirred by the stream, due to their spherical shape, metal ion eluting bodies rotates smoothly. Therefore, the electrolytic cell is less damaged. According to the present invention, it will be possible to efficiently remove attachments on the surface when the metal ion eluting bodies engaged in mutual frictional movements.

Another optional aspect of the present invention provides a structure of hollowing out the inside of the metal ion eluting bodies in the water sterilizing apparatus.

It is possible to reduce the mass of each metal ion eluting body by hollowing up the inside of the metal ion eluting body. Therefore, it becomes possible to stir efficiently metal ion eluting bodies in the electrolytic cell without resorting to high-pressure stream.

Another optional aspect of the present invention provides a structure of disposing the inflow pipe and the inflow pipe with different water pressures in the water sterilizing apparatus.

In the present invention structured as mentioned above, because of the difference in water pressure for the inflow pipe and the outflow pipe, the water supplied from the inflow pipe and circulating in the electrolytic cell do not flow immediately out of the outflow pipe. As a stream develops and grows more complex because of a difference in pressure between the inflow pipe and the outflow pipe within the electrolytic cell, the stream remains longer within the electrolytic cell. In other words, it becomes possible to keep the stream in contact with the surface of metal ion eluting bodies for a longer length of time, and to provide thus a water sterilizing apparatus with a higher eluting effect of metal ions.

As an example of configuration of the inflow pipe and the outflow pipe, another optional aspect of the present invention provides, in the water sterilizing apparatus, the structure of disposing the inflow pipe and the outflow pipe in a direction deviated by a predetermined angle from the perpendicular direction to the axis core of each chamber of the electrolytic cell on the side surface of the container.

In the present invention structured as mentioned above, the inflow pipe and the outflow pipe are disposed in a direction deviated by a predetermined angle from the perpendicular direction to the axis core of each chamber of the electrolytic cell on the side surface of the container. In other words, due to the disposition of the inflow pipe and the outflow pipe in a direction wherein they do not pass through the axis core of each chamber of the electrolytic cell, the stream that entered in each chamber of the electrolytic cell flows in each chamber by rotating around the axis core. As a result, the stream circulates without stagnating in the electrolytic cell, and stirs efficiently the metal ion eluting bodies.

Incidentally, as it is enough that the inflow pipe and the outflow pipe are disposed in a direction of passing through the axis core of each chamber of the electrolytic cell, various angles are possible for the predetermined angle mentioned above. For example, the inflow pipe may be disposed at an angle adjacent to the inner circumference of each chamber of the electrolytic cell on the lower side of the container and the outflow pipe may be disposed at an angle adjacent to the inner circumference of each chamber of the electrolytic cell on the upper side of the container. Or, the inflow pipe and the outflow pipe may be disposed respectively at a different angle. And according to the present invention, it will be possible to provide examples of mode of disposing the inflow pipes and the outflow pipes for generating the stream of water for efficiently stirring the metal ion eluting bodies.

The outflow pipe needs not necessarily disposed on the side of the container. As a result, another optional aspect of the present invention provides a structure of disposing the outflow pipe on the upper side or the lower side of the container in a water sterilizing apparatus.

In the present invention structured as mentioned above, the outflow pipe is disposed on the upper side or the lower side of the container. In case where the outflow pipe is disposed on the upper surface of the container, the stream injected into the container flows out from the upper side by forming a rotating helical flow while moving upward in the electrolytic cell. On the other hand, in case where the outflow pipe is disposed on the lower surface side of the container, the stream introduced in the container flows out from the lower surface side by forming a rotating helical flow while moving downward in the electrolytic cell. And according to the present invention, it will be possible to provide examples of mode of disposing the inflow pipes and the outflow pipes for generating the stream of water for efficiently stirring the metal ion eluting bodies.

Another optional aspect of the present invention provides a structure of disposing the outflow pipe in a nearly perpendicular direction on the upper surface of the container in the water sterilizing apparatus.

Due to the disposition of the outflow pipe in nearly the perpendicular direction to the upper surface of the container, in the present invention structured as described above, the stream injected into the container flows out in the vertical direction from the upper surface by forming a rotating helical flow while moving upward in the electrolytic cell. And according to the present invention, it will be possible to provide examples of mode of disposing the inflow pipes and the outflow pipes for generating the stream of water for efficiently stirring the metal ion eluting bodies.

Another optional aspect of the present invention provides a structure of disposing a straightening vane at the intake gate of the inflow pipe in contact with the container for keeping the stream in a predetermined direction in the water sterilizing apparatus.

In the present invention structured as described above, the inflow pipe has a straightening vane for keeping the arriving stream in a predetermined direction at the intake port in contact with the container. As an example of the way of installing the straightening vane, it is possible to install one in such a way that it may lead the stream flowed into the container and circulating in the electrolytic cell in a direction along the inner wall of each chamber of the electrolytic cell. The installation of such a straightening vane can prevent the disruption of the stream when it is supplied into the electrolytic cell from the inflow pipe, and facilitates the stream to circulate in the electrolytic cell. And the present invention will facilitate the circulation of the stream of water in the electrolytic cell by guiding the direction of the stream of water that flowed into the container from the inflow pipe.

Another optional aspect of the present invention provides a structure of disposing the inflow pipe and the outflow pipe in each chamber of the electrolytic cell in the water sterilizing apparatus.

Each chamber of the electrolytic cell contains respectively a plurality of metal ion eluting bodies, and in each chamber it is necessary to stir the metal ion eluting bodies with stream. As a result, in the present invention structured in this way, stream flows into each chamber from the inflow pipe disposed in each chamber of the electrolytic cell. And the stream containing metal ions eluted in each chamber flows out from the outflow pipe disposed in each chamber. And according to the present invention, it will be possible to make the stream of water flow into each chamber of the electrolytic cell and to make the metal ion solution flow out from each chamber.

Another optional aspect of the present invention provides a structure wherein the inner wall of each chamber of the electrolytic cell is nearly cylindrical in the water sterilizing apparatus.

In the present invention structured as described above, the inner wall of each chamber of the electrolytic cell is nearly cylindrical. The adoption of nearly cylindrical shape for the inner wall of each chamber of the electrolytic cell enables the stream to circulate freely in the electrolytic cell, and the metal ion eluting bodies stirred by the stream to rotate freely. And according to the present invention, the stream of water will circulate smoothly in the electrolytic cell and the stirred metal ion eluting bodies will rotate smoothly.

Another optional aspect of the present invention provides a structure wherein the conductor plate mentioned above is disposed at the bottom surface of each chamber of the electrolytic cell with one of its surfaces exposed to the inside of each chamber in the water sterilizing apparatus.

In the present invention structured as described above, the conductor plate is disposed at the bottom surface of each chamber of the electrolytic cell with one surface exposed to the inside of each chamber. The metal ion eluting bodies contained in each chamber are grounded on the conductor plate. As a result, the conductor plate and the metal ion eluting bodies are energized, and the metal ion eluting bodies play the role of electrodes in the process of electrolysis. And according to the present invention, the metal ion eluting bodies will easily come into contact with the conductive plate.

In order to stabilize the contact between and the energized state of the conductor plate and the metal ion eluting bodies, another optional aspect of the present invention provides a structure of disposing holders for holding freely rotatably the metal ion eluting bodies superposed on other metal ion eluting bodies and positioned at the top stage among the metal ion eluting bodies contained in each chamber of the electrolytic cell by limiting the extent of displacement within a predetermined extent in each chamber in the water sterilizing apparatus.

In the present invention structured as described above, holders are disposed in each chamber of the electrolytic cell, and the holder hold freely rotatably the metal ion eluting bodies superposed on other metal ion eluting bodies and positioned at the top stage among the metal ion eluting bodies contained in each chamber of the electrolytic cell by limiting the extent of displacement within a predetermined extent in each chamber. The top-stage metal ion eluting bodies play the role of pressing from above other metal ion eluting bodies positioned at lower stages. Therefore, it is possible to always keep the top-stage metal ion eluting bodies superposed on other metal ion eluting bodies by limiting the extent of movement of the top-stage metal ion eluting bodies, and to stably keep the lower-stage metal ion eluting bodies in contact with the bottom surface of each chamber.

Incidentally, the top-stage metal ion eluting bodies are not fixed by the holders mentioned above but are freely rotatably held. Therefore, they rotate freely by the agitating action of the stream, and keep up frictional movements with other metal ion eluting bodies. And according to the present invention, it will be possible to stably maintain the state of contact between the metal ion eluting bodies and the conductive plate.

Another optional aspect of the present invention provides a structure of constituting the container by an external container connected with the inflow pipe and an internal container on the lateral surface of which a plurality of through-holes pierce through up to the electrolytic cell are formed and are connected with the outflow pipe in the sterilizing apparatus.

In the present invention structured as described above, the container is constituted by an external container and an internal container. As the inflow pipe is connected with the external container, the stream injected from the inflow pipe flows into the space between the external container and the internal container. Due to the formation of a plurality of through-holes piercing through up to the electrolytic cell on the lateral surface of the internal container, the stream that flowed into the space between the external container and the internal container flows into the electrolytic cell through the plurality of through-holes. Then as the stream stirs the metal ion eluting bodies in the electrolytic cell, the stream containing a sufficient quantity of eluted metal ions flows out from the outflow pipe connected with the internal container.

In other words, the stream that penetrated into the container as a stream from the inflow pipe passes through the plurality of through-holes and is divided into a plurality of streams when it flows into the electrolytic cell containing the metal ion eluting bodies. The division of the stream that flowed in from the inflow pipe into a plurality of streams enables to efficiently form rotating streams in the space for containing the metal ion eluting bodies.

And if the through-holes are made smaller than the area of the intake port of the inflow pipe, the stream will be pressurized when it passes through the through-holes, and the velocity of the stream passing through the through-holes increases. Therefore, streams into the electrolytic cell of the inner container with a stronger impetus than it does from the inflow pipe. And according to the present invention, it will be possible to form effectively a rotating stream in the electrolytic cell and stir the metal ion eluting bodies.

When electrolysis is carried out by fixing the positive pole side and the negative pole side of the metal ion eluting bodies contained in each chamber, scales stick on the surface of the negative pole side of the metal ion eluting bodies reducing their electrolytic capacity. Therefore, another optional aspect of the present invention provides a structure of the voltage feeding unit having a polarity switching circuit capable of switching the polarity of DC voltage supplied to the conductor in the water sterilizing apparatus.

In the present invention structured as described above, the voltage feeding unit has a polarity switching circuit. As the polarity of DC voltage supplied to the conductor is switched by the polarity switching circuit, the polarity of metal ion eluting bodies that enter into contact with each conductive plate can be switched. As a result, the positive pole wherein oxidation reaction occurs and the negative pole wherein reduction reaction occurs change their places and any decrease in the electrolytic capacity resulting from the attachment of scales can be prevented. The frictional movement among the metal ion eluting bodies described above coupled with such switching of positive and negative poles will improve drastically the removal effect of attachments sticking on the surface of metal ion eluting bodies. And according to the present invention, it will be possible to prevent more effectively any decline in the electrolytic capability due to the attachment of scale on the surface of the metal ion eluting bodies.

So far, we have described the case of stirring metal ion eluting bodies by the stream circulating in the electrolytic cell and causing them to enter into mutual frictional movement. However, metal ion eluting bodies may be put in motion by other actions in addition to the stream. As a result, another optional aspect of the present invention provides a structure of making predetermined metal ion eluting bodies among those contained in each chamber rotate by the rotational power generated by the predetermined driving unit and transmitted by the predetermined members, and the other metal ion eluting bodies contained in the same chamber of the electrolytic cell as the rotating predetermined metal ion eluting bodies rotate by entering into contact with the rotating predetermined metal ion eluting bodies in the water sterilizing apparatus.

In the present invention structured as described above, the rotational power generated by the driving unit is transmitted through the predetermined member to predetermined metal ion eluting bodies among those contained in each chamber. As a result, the predetermined metal ion eluting bodies rotate in the electrolytic cell. And the other metal ion eluting bodies contained in the same chamber of the electrolytic cell as the rotating predetermined metal ion eluting bodies rotate by frictional force upon contact with the rotating predetermined metal ion eluting bodies. In other words, the metal ion eluting bodies move more violently by taking advantage of the motive force of the driving unit, in addition to the stirring action of stream. In this way, they rub more efficiently the surface of each other as compared with the case of being subjected to the stirring action. As a result, the removing effect of the attachments from the surface improves, and the eluting effect of metal ions improves further. And according to the present invention, it will be possible to keep stably the metal eluting bodies rubbing each other and to maintain the elution effect of metal ions at a high level.

As an example of relationship between the metal ion eluting bodies and the driving unit, another optional aspect of the present invention provides, in the water sterilizing apparatus, a structure of linking the metal ion eluting bodies positioned at the top stage being superposed on the other metal ion eluting bodies among the metal ion eluting bodies contained in each chamber with members rotating by the rotational power generated by the driving unit. In other words, when metal ion eluting bodies are stacked up as they are contained in each chamber, the metal ion eluting bodies at the top position superposed on other metal ion eluting bodies are linked with the driving unit so that the metal ion eluting bodies at the top stage may rotate directly. And the other metal ion eluting bodies supporting underneath the top-stage metal ion eluting bodies rotate being exposed to the frictional force of the rotation. As a result, the surface of each metal ion eluting bodies can be efficiently rubbed while the lower-stage metal ion eluting bodies are stably kept in contact with the bottom surface of each chamber. And according to the present invention, it will be possible to keep stably the metal ion eluting bodies rubbing each other and to stabilize the state of contact between the metal ion eluting bodies and the conductor plate.

Here, the means of sterilizing water needs not be necessarily limited to substantive apparatuses, and it is easy to understand that the method functions.

Therefore, another aspect of present invention provides a metal ion solution created by comprising containing a plurality of metal ion eluting bodies in each chamber of the container having an electrolytic cell composed of two chambers that are not partially separated, passing water from the inflow pipe connected with the container to the outflow pipe connected with the container, making metal ion eluting bodies keep on mutual frictional movements among themselves by the stirring action of stream, and feeding the conductor provided in each chamber of the electrolytic cell with DC voltage, bringing the metal ion eluting bodies in contact with the conductor having a positive polarity in one chamber to constitute a positive pole and with the conductor having a negative polarity in the other chamber to constitute a negative pole, thus causing an electrolysis to occur and eluting metal ions.

In other words, the means is not necessarily limited to substantive apparatuses, and the method is clearly effective.

Thus, the invention of water sterilizing apparatus or water sterilizing method can be grasped by taking the viewpoint of sterilizing water by eluting metal ions into water. On the other hand, the structure of the invention can be grasped as a method of producing water containing much metal ions.

Therefore, an optional aspect of the present invention is the method of producing metal ion eluted water corresponding to the structure of the above-mentioned invention. And another optional aspect of the present invention relates to the metal ion eluted water produced by using the above-mentioned invention structure. And according to the present invention, it will be possible to form efficiently metal ion solution in which a sufficient amount of metal ions has eluted by eluting metal ion in the water by the electrolytic action and the contact action between the metal ion eluting bodies and the water while removing attachments on the surface of the metal ion eluting bodies.

It is also possible to eliminate the necessity of depending on the action of stream for moving the metal ion eluting bodies in the electrolytic cell. For this reason, another aspect of present invention provide a water sterilizing apparatus comprising a container having an electrolytic cell composed of two chambers that are not partially separated, and a voltage feeding unit connected with the conductor composed of conductive members provided in each chamber of the electrolytic cell and feeding the conductor with DC voltage, and a plurality of metal ion eluting bodies contained in each chamber of the electrolytic cell, wherein predetermined metal ion eluting bodies among the metal ion eluting bodies contained in each chamber rotate by the rotational power generated by the predetermined driving unit and transmitted by the predetermined members, and other metal ion eluting bodies contained in the same chamber of the electrolytic cell as the rotating predetermined metal ion eluting bodies rotate by entering into contact with the rotating predetermined metal ion eluting bodies, and in addition the metal ion eluting bodies enter into contact with the conductor connected with the positive side of the voltage feeding unit in one chamber to become the positive pole and with the conductor connected with the negative side of the voltage feeding unit in another chamber to become the negative pole causing an electrolysis to occur and metal ions to elute in the water of the electrolytic cell.

The present invention is the same as the inventions described above in that metal ions are eluted by electrolysis with the metal ions in each chamber of the electrolytic cell in one chamber serving as the positive pole and those in the other chamber serving as the negative pole by the DC voltage fed from the voltage feeding unit to the conductor. In the present invention, the rotational power generated by the predetermined driving unit is used as the power of metal ion eluting bodies. In other words, the predetermined metal ion eluting bodies among the metal ion eluting bodies contained in each chamber of the electrolytic cell rotate by the rotational power generated by the driving unit and transmitted by the predetermined members, and the other metal ion eluting bodies contained in the same chamber of the electrolytic cell as the rotating predetermined metal ion eluting bodies rotate by entering in contact with the rotating predetermined metal ion eluting bodies. As a result, metal ion eluting bodies can rub the surface of each other, and attachments attached on the surface are removed and the eluting effect of metal ions in water is maintained at a high level.

The present structure is especially suitable for not sterilizing in the process of making water pass through the container but for sterilizing while the movement of water with the outside is prohibited after a predetermined amount of water is poured into the container. And according to the present invention, it will be possible to provide a water sterilizing apparatus or a water sterilizing method capable of eluting efficiently metal ions in water by the electrolytic action and the contact action between the metal ion eluting bodies and the water while removing attachments on the surface of the metal ion eluting bodies, even in the case where the metal ion eluting bodies cannot be stirred by the action of the stream of water.

The technological concept of sterilizing water as described above can be grasped as a method thereof. Accordingly, an optional aspect of present invention is a water sterilizing method corresponding to the above-mentioned structure. And according to the present invention, it will be possible to provide a water sterilizing apparatus or a water sterilizing method capable of eluting efficiently metal ions in water by the electrolytic action and the contact action between the metal ion eluting bodies and the water while removing attachments on the surface of the metal ion eluting bodies, even in the case where the metal ion eluting bodies cannot be stirred by the action of the stream of water.

And the above-mentioned structure can be grasped as a method of producing water containing many metal ions. Therefore, another optional aspect of present invention relates to a method of producing metal ion eluting bodies corresponding to the above-mentioned structure. Furthermore, another optional aspect of present invention relates to the metal ion eluted water generated by using the above-mentioned structure. And according to the present invention, it will be possible to produce efficiently metal ion solution in which a sufficient amount of metal ions has eluted by the electrolytic action and the contact action between the metal ion eluting bodies and the water while removing attachments on the surface of the metal ion eluting bodies, even in the case where the metal ion eluting bodies cannot be stirred by the action of the stream of water.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purpose of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

DETAILED DESCRIPTION OF INVENTION

The detailed description set forth below in connection with the appended drawings is intended as description of presently preferred embodiments of the invention and is not intended to represent the only forms in which the present invention may be constructed and or utilized.

We will now describe the embodiments of the present invention according to the following order.

Figure 1:
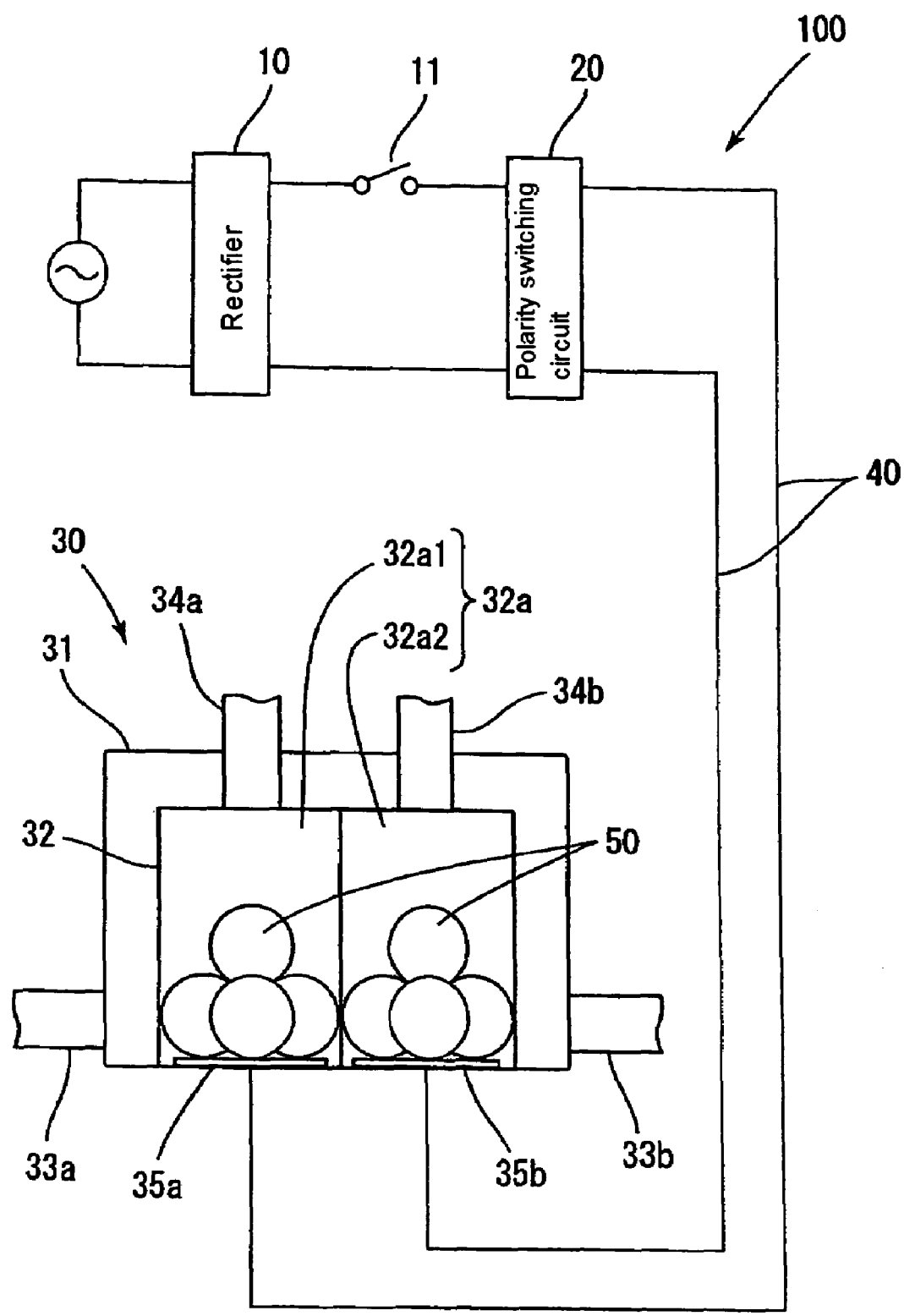
FIG. 1 is an exemplary illustration of a schematic block diagram of a water sterilizing apparatus according to the present invention.

(1) The first embodiment (2) Other embodiments (3) Conclusion (1) The First Embodiment FIG. 1 is a schematic block diagram of a water sterilizing apparatus according to the first embodiment. In the figure, the water sterilizing apparatus 100 includes a rectifier 10, a switch 11, a polarity switching circuit 20, a container 30 and a conductor 40 connecting these constituent elements, and metal ion eluting bodies 50 contained within the container 30. The rectifier 10 converts AC voltage fed from the commercial AC power source into DC voltage. The DC voltage converted by the rectifier 10 is fed to the conductive plates 35a, 35b composed of two conductive members provided in the container 30 through the polarity switching circuit 20. The polarity switching circuit 20 can switch at regular intervals the polarity of the DC voltage fed to the conductive plates 35a, 35b, and as a result can switch at regular intervals the positive side and the negative side of the two conductive plates 35a, 35b. And the circuit includes a switch 11, which is turned ON to feed voltage when stream is fed into the container 30 to use the water sterilizing apparatus 100, and the switch 11 is turned OFF to stop feeding voltage when stream is not fed into the container 30.

The container 30 whose structure will be described later includes, roughly speaking, an external container 31, an internal container 32 of a size that can be wholly contained within the external container 31, inflow pipes 33a, 33b, and outflow pipes 34a, 34b. The internal container 32 includes inside an electrolytic cell 32a divided into a first chamber 32a1 and a second chamber 32a2. The first chamber 32a1 and the second chamber 32a2 include respectively a plurality of metal ion eluting bodies 50. In the present embodiment, silver ion eluting bodies 51 are used as metal ion eluting bodies 50. And conductive plates 35a and 35b are respectively fixed on the bottom surface of the first chamber 32a1 and the second chamber 32a2, and are connected with the polarity switching circuit 20 mentioned above.

We will now describe the silver ion eluting bodies 51 contained in the electrolytic cell 32a. An optional number can be chosen for the number of silver ion eluting bodies 51 contained therein.

Figure 2:
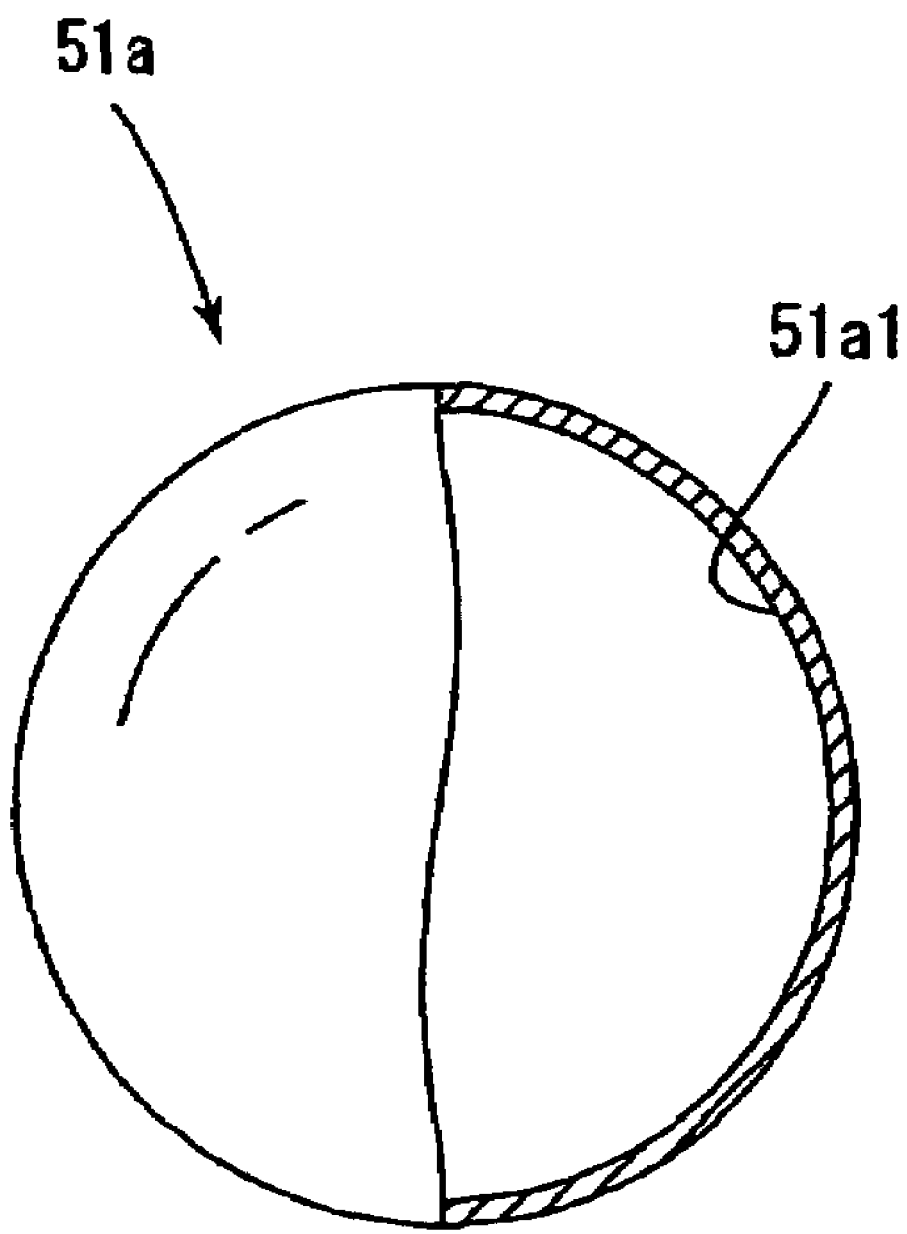
FIG. 2 is an exemplary illustration of a partially broken front view of one of the shapes of silver ion eluting body.

FIG. 2 is a partially broken front view showing the silver ion eluting bodies 51a used in the present embodiment.

In the figure, the silver ion eluting bodies 51a are spherical. Because of their spherical shape, they can move smoothly rotating in the electrolytic cell 32a when the silver ion eluting bodies 51a are stirred by the stream. And the spherical shape is suited for thoroughly rubbing the surface of each other while they are stirred by the stream. And the adoption of the spherical shape for the silver ion eluting body 51a enables, as mentioned later, to prevent any decline in the silver ion eluting effect by attachments on the surface.

The right-side half of the figure shows the vertical section of the silver ion eluting body 51a and that the inside of the silver ion eluting body 51a is hollow. In other words, a spherical hollow part 51a1 is formed inside the silver ion eluting body 51a.

The hollowness of the inside enables to reduce the mass of each silver ion eluting body 51a. Therefore, it will be possible to efficiently stir the silver ion eluting bodies 51a by the stream flowing into the electrolytic cell 32a. Here, the silver ion eluting body 51a may be formed by pure silver, highly concentrated silver or may be formed by carrying out a surface treatment such as silver plating on the surface of the spherical carrier.

Figure 3:
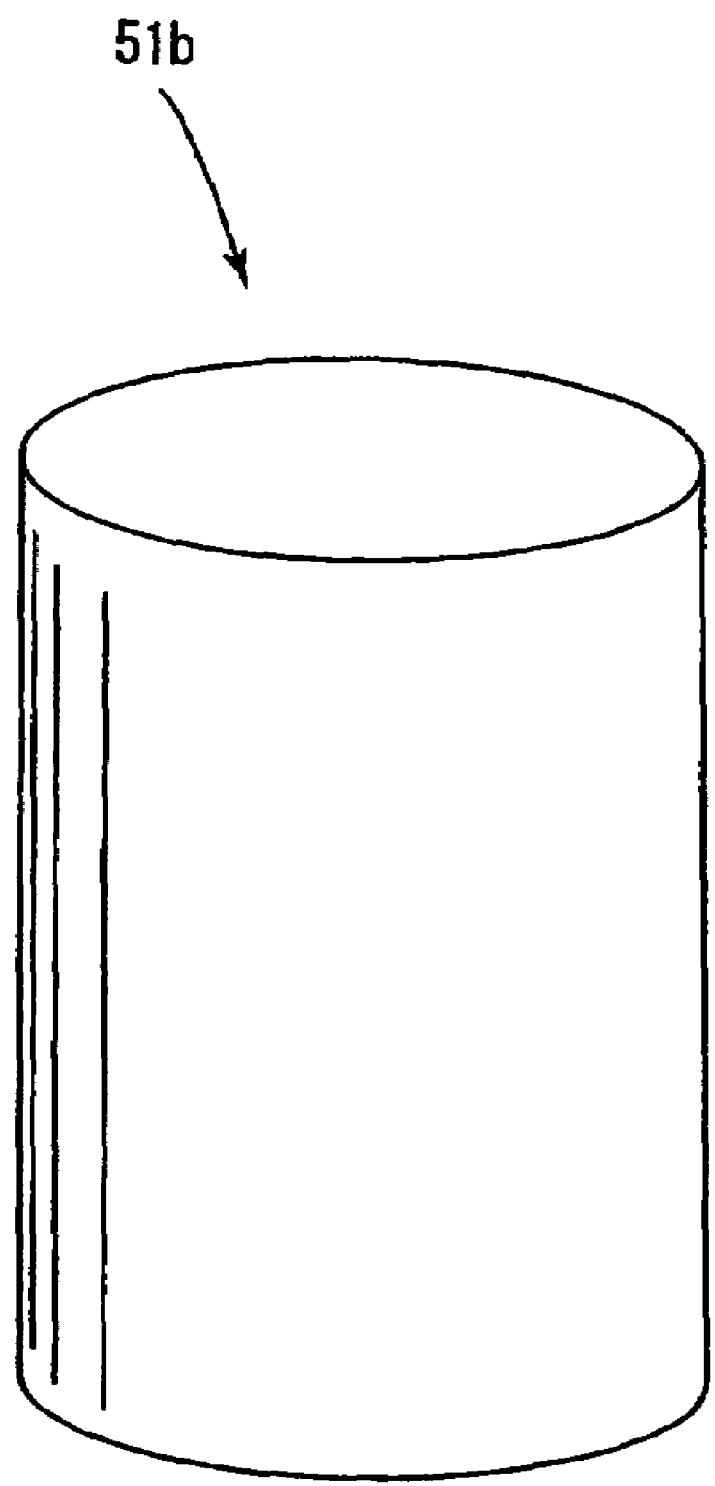
FIG. 3 is an exemplary illustration of a view showing another shape of the silver ion eluting body.

FIG. 3 shows an example of another shape of the silver ion eluting body 51.

Figure 4:
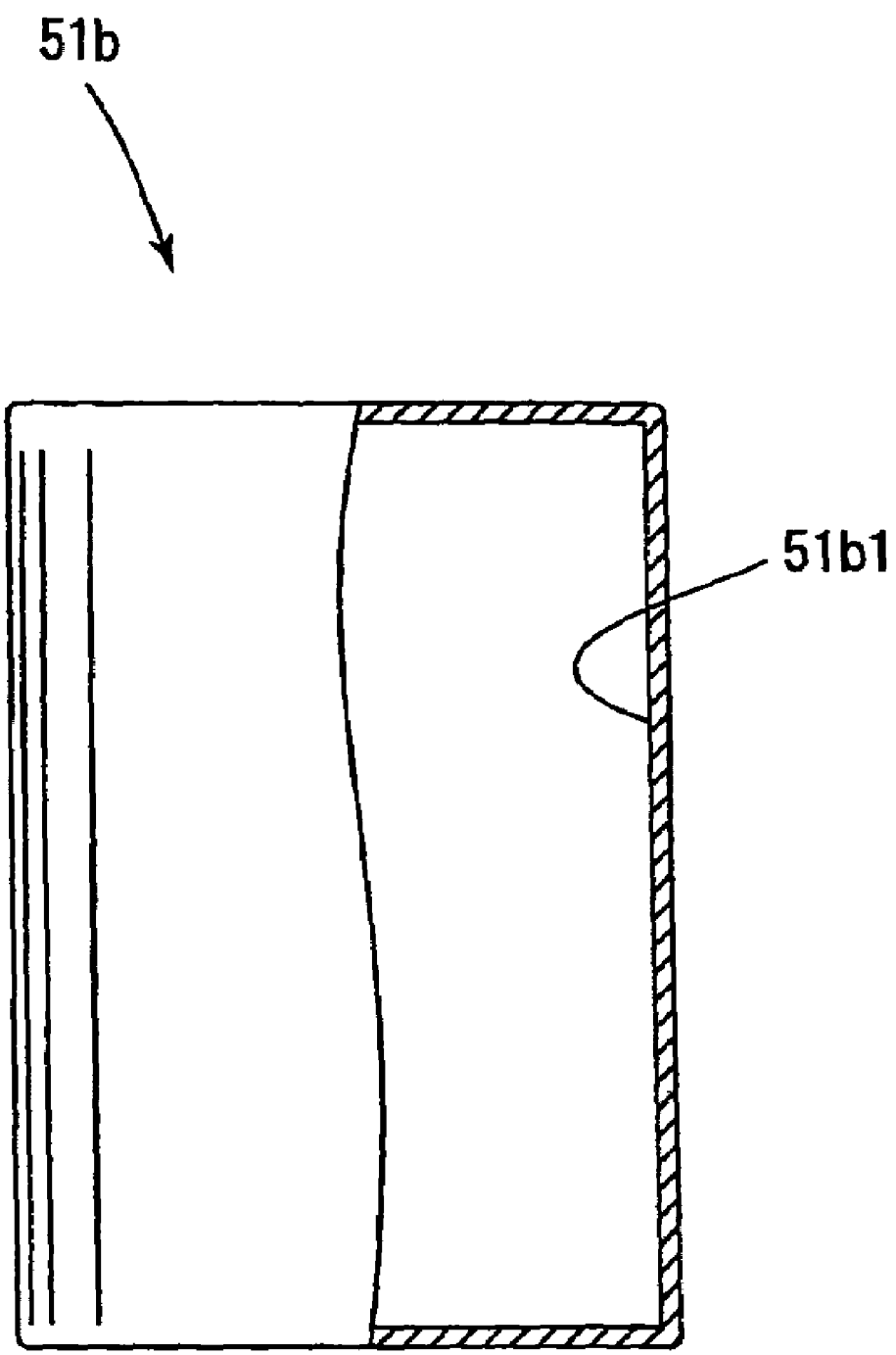
FIG. 4 is an exemplary illustration of a partially broken front view of another shape of the silver ion eluting body.

In the figure, the silver ion eluting body 51b has a cylindrical shape. As the silver ion eluting body 51b of the shape can rub thoroughly on the surface of each other while being stirred by the water current, it is possible to prevent any decline in the silver ion eluting effect by water stains on the surface as described below. FIG. 4 is a partially broken front view of the silver ion eluting body 51b that shows, like the silver ion eluting body 51a described above, the silver ion eluting body 51b is hollow inside. In other words, a cylindrical hollow part 51b1 is formed inside the silver ion eluting body 51b. Like the silver ion eluting body 51a mentioned above, the silver ion eluting body 51b may be formed by pure silver or by high concentrated silver, or may be formed by carrying out a surface treatment such as silver plating on the surface of cylindrical carriers. Moreover, the shape of the silver ion eluting body 51 is not limited to the shape mentioned above.

Here, we will describe the effect of the silver ion.

Generally speaking, the silver ion is known to have a strong sterilizing effect. In particular, the silver ion is known to have a strong sterilizing effect against *legionella* and displays a sterilizing effect against the *legionella* found mixed in water by the action of a very small amount in a short period of time. The infectious diseases by *legionella* are caused by the inhalation of proliferated *legionella*, and *legionella* proliferates in symbiosis with algae in water and ameba. As silver ion annihilate bacteria by adsorbing fast on the cell of various bacteria, the development of various bacteria is suppressed, and the development of algae and ameba can be prevented. In other words, it is possible to prevent the development of algae and ameba which are the cause of proliferation of *Legionella*

In addition, silver ion has a sterilizing effect against 0-157 pathogenic colon *bacillus*, colibacillus, acid-fast bacteria (senile tubercle *bacillus*), MRSA, general pathogenic bacteria and the like.

And silver ion, completely free of irritating odors due to chloric chemicals, chapped skin, fowl odors and harmless to the human body, is suitable for bath tubs, swimming pools, hot spring facilities, water storage tanks, steam sterilizing apparatuses, and water sterilizing process at food processing plants.

Moreover, as silver ion causes no corrosion of piping, machinery and equipment, other construction materials, sash and the like, the deterioration of apparatuses used for water sterilization barely progresses.

We will then describe the structure of the container 30 and the elution of silver ion.

Figure 5:
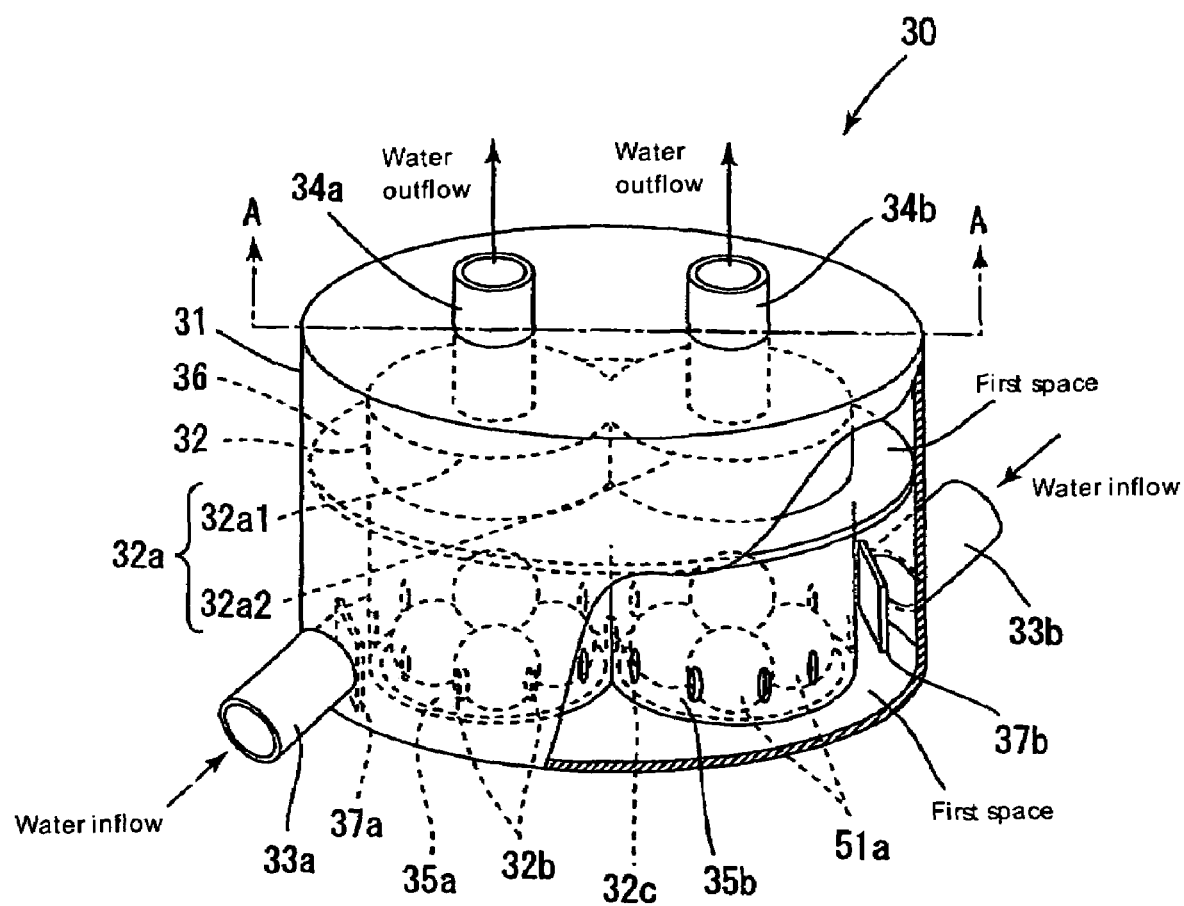
FIG. 5 is an exemplary illustration of a perspective view of the container for the first embodiment of the present invention.
Figure 6:
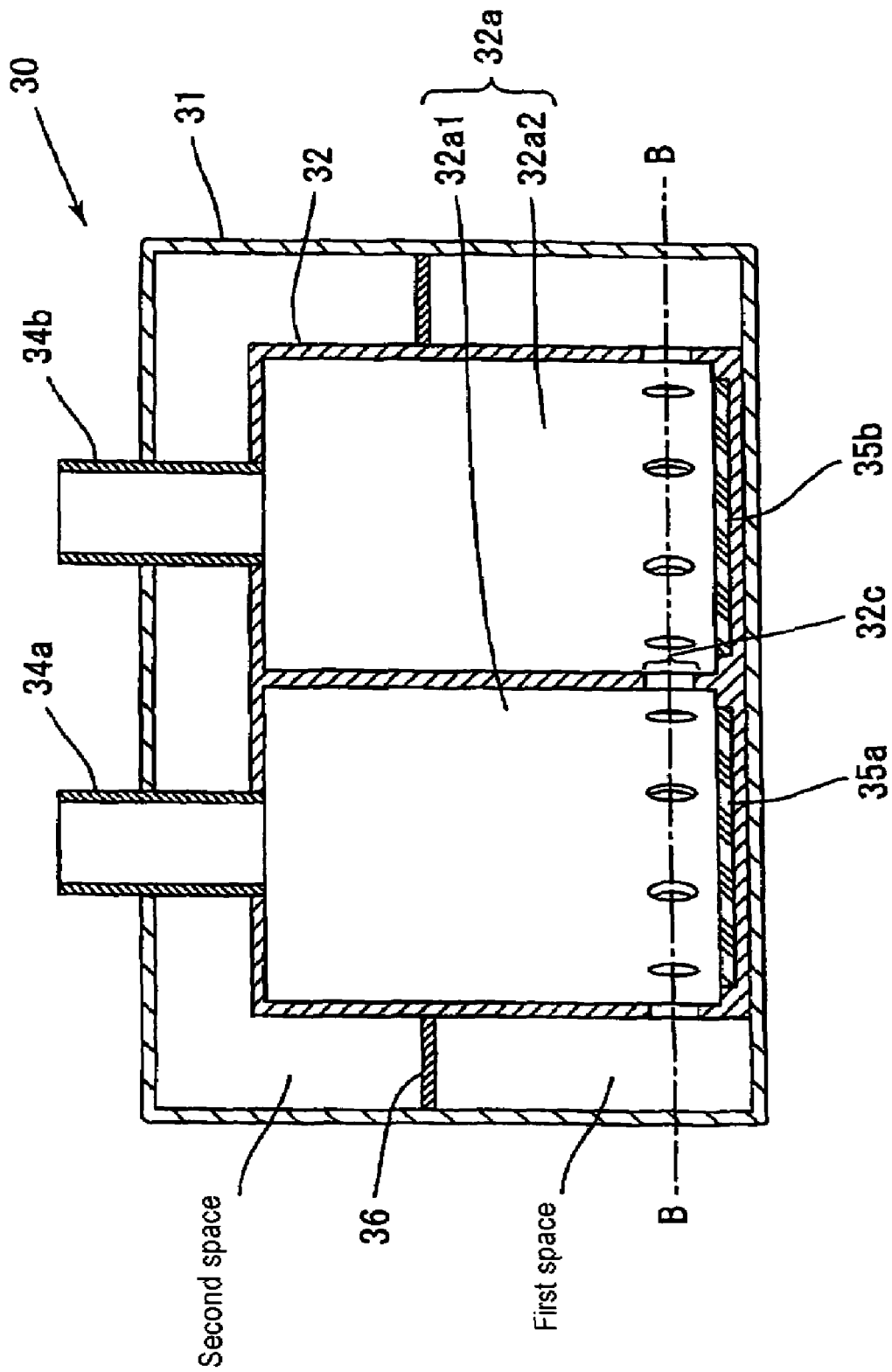
FIG. 6 is an exemplary illustration of a sectional side elevation of the container.

FIG. 5 is a perspective view of the container 30. FIG. 6 shows the section of the container 30 cut out along the A-A line in FIG. 5. In both figures, a conductor 40 connected with the conductive plates 35a, 35b and the polarity switching circuit 20 is omitted. And in FIG. 6 the silver ion eluting bodies 51a are omitted.

The inflow pipes 33a, 33b are connected with the external container 31, and are disposed on the lower side surface of the external container 31 at a predetermined angle to the side surface. The internal container 32 is of a shape formed by combining two quasi-cylindrical containers cut in the longitudinal sectional direction near the side surface between the cut surfaces. The outflow pipes 34a, 34b are disposed almost vertically from the upper surface of the internal container 32, and each outflow pipe 34a, 34b is connected respectively with the first chamber 32a1 and the second chamber 32a2. However, the number, position of disposition and direction of disposition of the inflow pipe and the outflow pipe can be set optionally.

The internal container 32 is divided into the first chamber 32a1 and the second chamber 32a2 at the part where the two almost cylindrical containers overlap. However, a window 32c of a dimension through which the silver ion eluting bodies 51a cannot pass is formed in a part of the partition between the first chamber 32a1 and the second chamber 32a2, and the internal container 32 is not completely separated. The inside of the first chamber 32a1 and the second chamber 32a2 is cylindrically hollow. And the internal container 32 has a plurality of through-holes 32b in the lower side part. The through-holes 32b penetrate into the side surface of the internal container 32, and link the outside of the internal container 32 and the inside of the electrolytic cell 32a.

Between the external container 31 and the internal container 32, a block plate 36 is provided at a position above the inflow pipes 33a, 33b and through-hole 32b and below the outflow pipes 34a, 34b. The block plate 36 fills the gap between internal circumference of the external container 31 and the external circumference of the internal container 32, and separates the space between the external container 31 and the internal container 32 into the lower first space and the upper second space.

Conductive plates 35a, 35b are fixed respectively with a surface exposed in the chamber on the bottom surface of the first chamber 32a1 and the second chamber 32a2. Therefore, the silver ion eluting bodies 51a contained respectively in a plurality in the first chamber 32a1 and the second chamber 32a2 are directly in contact with the conductive plate 35a or the conductive plate 35b to be fed with voltage, or enter into contact with other silver ion eluting bodies 51a contained also in the same chamber to be fed with voltage indirectly from the conductive plate 35a or the conductive plate 35b. As a result, in the chamber provided with a conductive plate whose polarity has turned positive being fed with a DC voltage, the silver ion eluting bodies 51a turn into positive poles. On the other hand, in the chamber provided with a conductive plate whose polarity has turned negative, the silver ion eluting bodies 51a turn into negative poles. Here, the conductive plate 35a in the first chamber 32a1 serves as the positive side and the conductive plate 35b in the second chamber 32a2 serves as the negative side.

In the container 30 thus structured, the stream that has flowed in through the inflow pipes 33a and 33b flows in the first place into the first space. The stream circulates in the first space and flows into the electrolytic cell 32a through the through-hole 32b. As the block plate 36 completely blocks the flow of water between the first space and the second space, the whole stream that has flowed into the first space flows into the electrolytic cell 32a. The stream that has flowed into the electrolytic cell 32a circulates in each of the first chamber 32a1 and the second chamber 32a2 while stirring the silver ion eluting bodies 51a. In other words, the positive poles and the negative poles for electrolysis are stirred by the stream and move while rotating in the first chamber 32a1 and the second chamber 32a2. And the stream containing the silver ions that eluted from the silver ion eluting bodies 51a flows out from the outflow pipes 34a and 34b.

Straightening vanes 37a and 37b may be provided in the inlet port where the inflow pipes 33a and 33b come into contact with the external container 31 so that the stream that has flowed into the first space through the inflow pipes 33a and 33b may efficiently circulate in one direction in the first space. The installation of straightening vanes 37a and 37b at an angle suitable for guiding the stream that has flowed through the inflow pipes 33a and 33b in the direction along the inner wall of the external container 31 will facilitate the stream to circulate in one predetermined direction in the first space.

Figure 7:
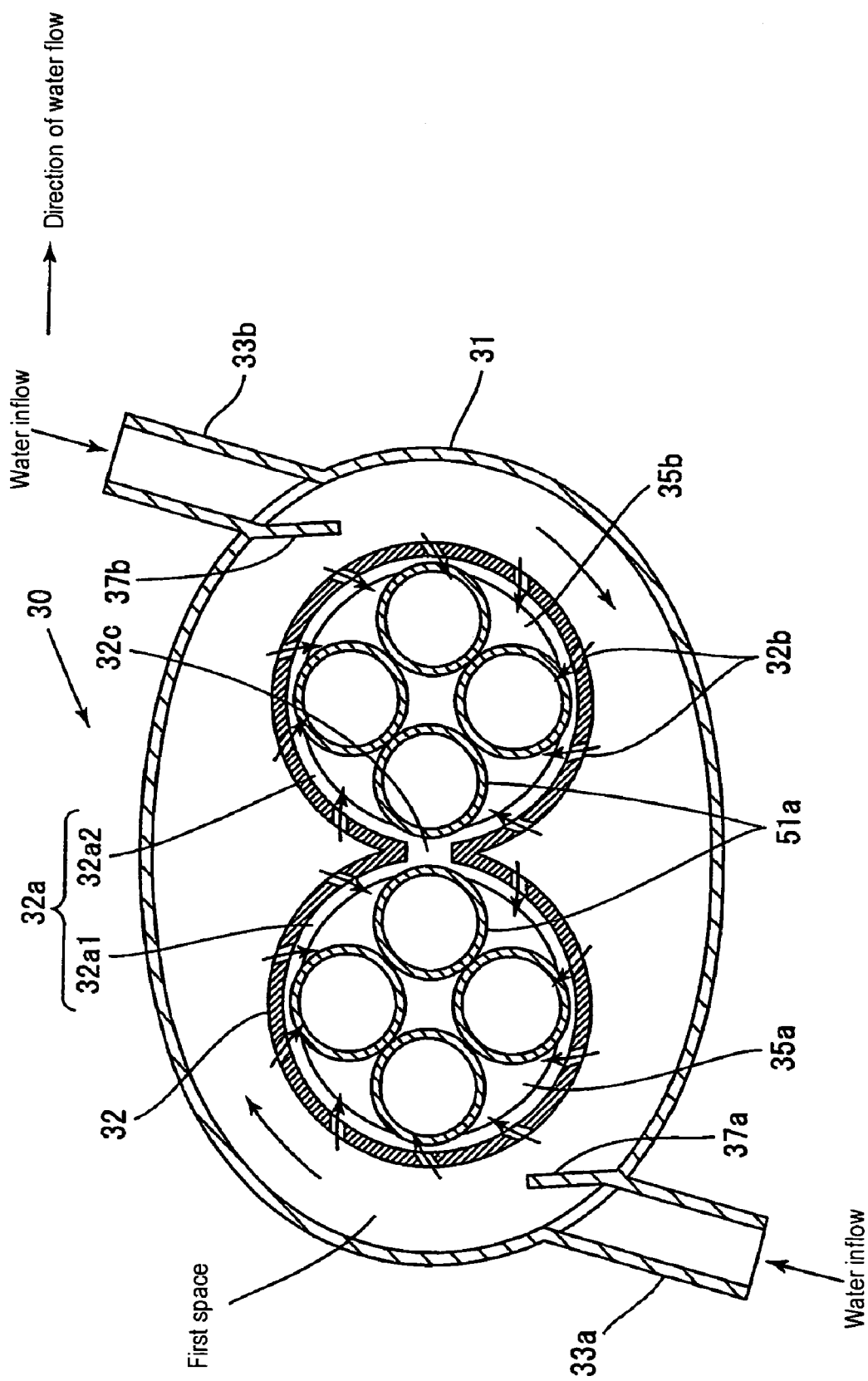
FIG. 7 is an exemplary illustration of a horizontal sectional view of the container.

FIG. 7 shows the section of the container 30 cut out along the line B-B shown in FIG. 6. In the figure, however, the first chamber 32a1 and the second chamber 32a2 contain the silver ion eluting bodies 51a.

As shown in the figure, the stream circulating in one predetermined direction in the first space flows into the electrolytic cell 32a through a plurality of through-holes 32b formed on the side surface of the internal container 32. The formation of the through-holes 32b in such a way that it may penetrate aslant the side surface of the internal container 32 facilitates the circulating stream mentioned above to flow into the electrolytic cell 32a. And in the first chamber 32a1 and the second chamber 32a2 of the electrolytic cell 32a the stream flows in respectively by passing through through-holes 32b from a plurality of places around, a rotating stream in one predetermined direction can be easily formed in each chamber. As a result, the silver ion eluting bodies 51a are stirred efficiently by the stream and move rotating in the first chamber 32a1 and the second chamber 32a2.

Incidentally, the number and size of the through-hole 32b and the incidence angle of the through-hole 32b to the internal container 32 may be varied depending on the bore and the position of disposition of the inflow pipes 33a and 33b and the outflow pipes 34a and 34b, or the pressure of the stream and various other conditions.

For electrolysis to occur in the electrolytic cell 32a, the silver ion eluting bodies 51a contained and serving as the positive poles in the first chamber 32a1 and the silver ion eluting bodies 51a contained and serving as the negative poles in the second chamber 32a2 must approach each other to some extent. As described above, a window 32c is formed between the first chamber 32a1 and the second chamber 32a2. Therefore, any one of the silver ion eluting bodies 51a contained in the first chamber 32a1 and any one of the silver ion eluting bodies 51a contained in the second chamber 32a2 approach each other on both sides of the window 32c while each silver ion eluting body 51a is stirred by the stream. As a result, electrolysis occurs, and silver ions (Ag+) elutes in water from the silver ion eluting bodies 51a of the first chamber 32a1 serving as the positive poles.

As each silver ion eluting body 51a moves by rotating constantly while it is stirred by the stream, the positive poles and the negative poles are not always kept in close proximity on both sides of the window 32c at any instant. However, because of its movement accompanied by constant rotation, even if a silver ion eluting body 51a goes away from the window 32c, the following silver ion eluting body 51a immediately approaches the window 32c and this process is repeated. Therefore, the state of close proximity of the silver ion eluting bodies 51a serving as the positive poles with the silver ion eluting bodies 51a serving as the negative poles is sufficiently secured on both sides of the window 32c while the silver ion eluting bodies 51a are stirred in the first chamber 32a1 and the second chamber 32a2, and as a result silver ions elute by means of electrolysis.

In addition to the silver ion elution effect due to the electrolysis mentioned above, the present invention has the silver ion elution effect due to the contact action between the surface of the silver ion eluting body 51a and the stream.

Due to an ionizing effect to a fixed extent in contact with water, silver elutes silver ions in the water. In the present application, because of the constant movement of the silver ion eluting bodies 51a while being stirred in the water, their contact action with the stream is strong, and the elution effect of silver ions is high.

And the constant repetition of friction movement of silver ion eluting bodies 51a among themselves has an effect of maintaining the silver ion elution effect at a high level.

Normally, when silver ion eluting bodies 51a are left in the water, water stains, rust and the like attach on the surface as the time passes. And in the case where electrolysis is carried out as described above, due to the action of plating, so-called scale resulting from the crystallization of mineral component of water attaches on the surface the silver ion eluting bodies 51a corresponding to negative poles. These attachments reduce remarkably the silver ion elution effect by the contact action with the stream and the silver ion elution effect by electrolysis. However, in the present invention, the silver ion eluting bodies 51a made to rub on the surface of each other remove mutually water stains, rusts, scale and other attachments on their surface. As a result, the state of practically no attachments having settled down on the surface of silver ion eluting bodies 51a is maintained while the stream is circulating in the electrolytic cell 32a.

Therefore, the silver ion elution effect by electrolysis and the silver ion elution effect by the action of contact with the stream are respectively maintained at a high level for a long period of time.

Furthermore, the removing effect of attachments on the surface of silver ion eluting bodies 51a will be very high if switching operations of positive and negative poles are carried out in addition to the removal of attachments by the frictional movements among the silver ion eluting bodies 51a.

The water sterilizing apparatus 100 can switch at regular intervals the polarity of the conductive plate 35a installed in the first chamber 32a1 and that of the conductive plate 35b installed in the second chamber 32a2 by the action of the polarity switching circuit 20. The switching of the polarity of the conductive plates 35a and 35b results in turning the silver ion eluting bodies 51a that have served as positive poles into negative poles and the silver ion eluting bodies 51a that have served as negative poles into positive poles. As a result, the silver ion eluting bodies 51a of the side causing oxidative reaction and the silver ion eluting bodies 51a of the side causing reductive reaction are switched, and thus the settling down of scale on the surface of the silver ion eluting bodies 51a corresponding to the negative poles can be prevented.

The fact that a state of practically no attachments settling down is maintained means that there is practically no need for replacement work of silver ion eluting bodies 51a due to a fall in the silver ion eluting effect due to attachment. Essentially, as it is enough to replace any silver ion eluting body 51a when its silver part is remarkably worn out and the silver ion elution effect has fallen down, there is practically no need for replacing the same, and the maintenance of any water sterilizing apparatus 100 as mentioned above will be very easy.

We will now describe the method of measuring silver ion elution by using the water sterilizing apparatus 100 structured as described above and the results obtained thereby.

Figure 8:
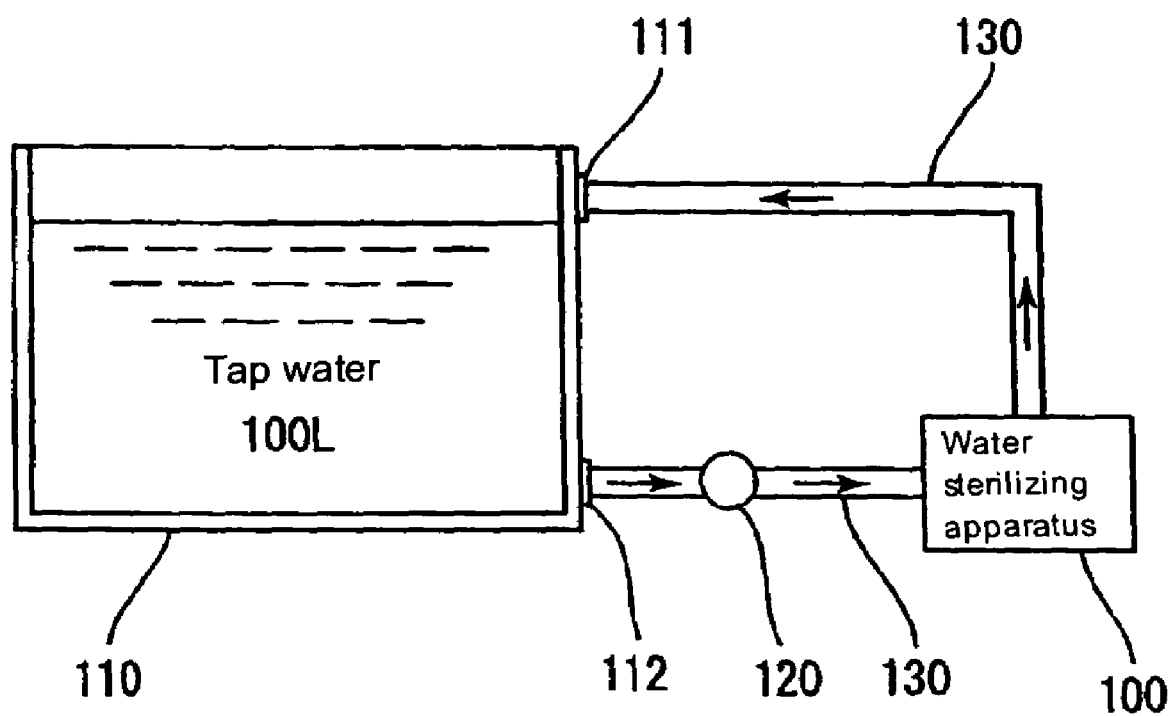
FIG. 8 is an exemplary illustration of a schematic block diagram of the whole apparatus used for the measurement of the amount of silver ions eluted.

FIG. 8 shows the schematic structure of the whole apparatus used for measuring the amount of silver ion elution.

The apparatus includes a water storage tank 110, a circulation pump 120, a water sterilizing apparatus 100, and pipes 130 connecting these components. The water storage tank 110 stores 100 liters of city water. However, the city water is dechlorinated. Hereinafter, any reference to city water means dechlorinated city water.

The city water that flowed from the intake 112 of the water storage tank 110 is fed into the water sterilizing apparatus 100 through the circulation pump 120. The city water fed into the water sterilizing apparatus 100 flows into the container 30 through the inflow pipes 33a and 33b connected with the pipe 130, absorbs the silver ion eluted from the silver ion eluting bodies 51a and flows out from the outflow pipes 34a and 34b. The city water is led to the inflow gate 111 of the water storage tank 110 through the pipe 130 connected with the outflow pipes 34a and 34b.

For this measurement, five spherical silver ion eluting bodies 51a measuring 40 mm in diameter are contained respectively in the first chamber 32a1 and another five in the second chamber 32a2. The five silver ion eluting bodies 51a are contained in each chamber, of which four are placed in the shape of a square on the bottom surface in contact with the conductive plates 35a or 35b and the remaining one is placed in such a way that it sits riding in the center of an area supported by the remaining four. Here, the internal diameter of the first chamber 32a1 and the second chamber 32a2 is set at a length whereby a certain distance remains between the surface of each of the four silver ion eluting bodies 51a and the inner wall of each chamber when the four of them are placed on the bottom surface. The choice of the length mentioned above for the internal diameter of the first chamber 32a1 and the second chamber 32a2 leaves a leeway for each silver ion eluting body 51a to be able to rotate in each chamber by the stirring action of the stream. At the same time, since each ion eluting body 51a rotates in each chamber by approaching or remaining in contact with the inner wall and other silver ion eluting bodies 51a in the same chamber, it is possible to prevent its separation with the conductive plates 35a and 35b provided on the bottom surface by deviating largely its orbit of rotation.

A silver ion eluting body 51a placed above an assembly of four silver ion eluting bodies 51a at approximately the central position plays the role of a weight for the lower four. As a result, the lower four silver ion eluting bodies 51a can maintain a stable state of being in contact with the conductive plates 35a or 35b at the bottom surface even while they are stirred by the stream, and the silver ion eluting bodies 51a in each chamber, fed power by the conductive plates 35a or 35b, turn into positive poles or negative poles.

And the DC voltage fed to the conductive plates 35a and 35b is set at 4.5V and the current is set at 2 mA.

Under such conditions, we circulated repeatedly 100 liters of city water between the water storage tank 110 and the water sterilizing apparatus 100 for an hour, and we measured the amount of silver ions eluted in the city water after the circulation.

As a result of the measurement, we detected 0.5-1.0 mg/liter of silver ions from the city water. It is said that silver ion used for sterilizing water will be sufficiently effective at a concentration of 0.01 mg/liter, and the amount of silver ion eluted by the measurement mentioned above may be considered as sufficient for sterilization effect. Therefore, the installation of the water sterilizing apparatus 100 according to the present invention in a bath tub, a swimming pool, hot spring resort facilities, a water storage tank, a vapor sterilizing apparatus, a food processing plant and other facilities requiring water sterilization enables to effectively sterilize water by the sterilization effect of silver ion.

The above measurement result shows the amount of silver ions eluted in the city water after repeatedly passing the same for an hour through the water sterilizing apparatus 100. And during the measurement, we confirmed that the amount of silver ions eluted in the water storage tank 110 increased with the passage of time. Therefore, the water sterilizing apparatus 100 enables to obtain silver ion solution of a concentration required by adjusting the time of circulating water based on the relationship between the time of repeatedly circulating water and the increasing amount of silver ions eluted. In other words, although the required concentration of silver ion solution may be different depending on the subject of sterilization processing such as bath water, city water, kitchen utensils and the like, the water sterilizing apparatus 100 enables to cope with different requirement for the concentration of silver ion for the sterilization processing of these items.

Figure 9:
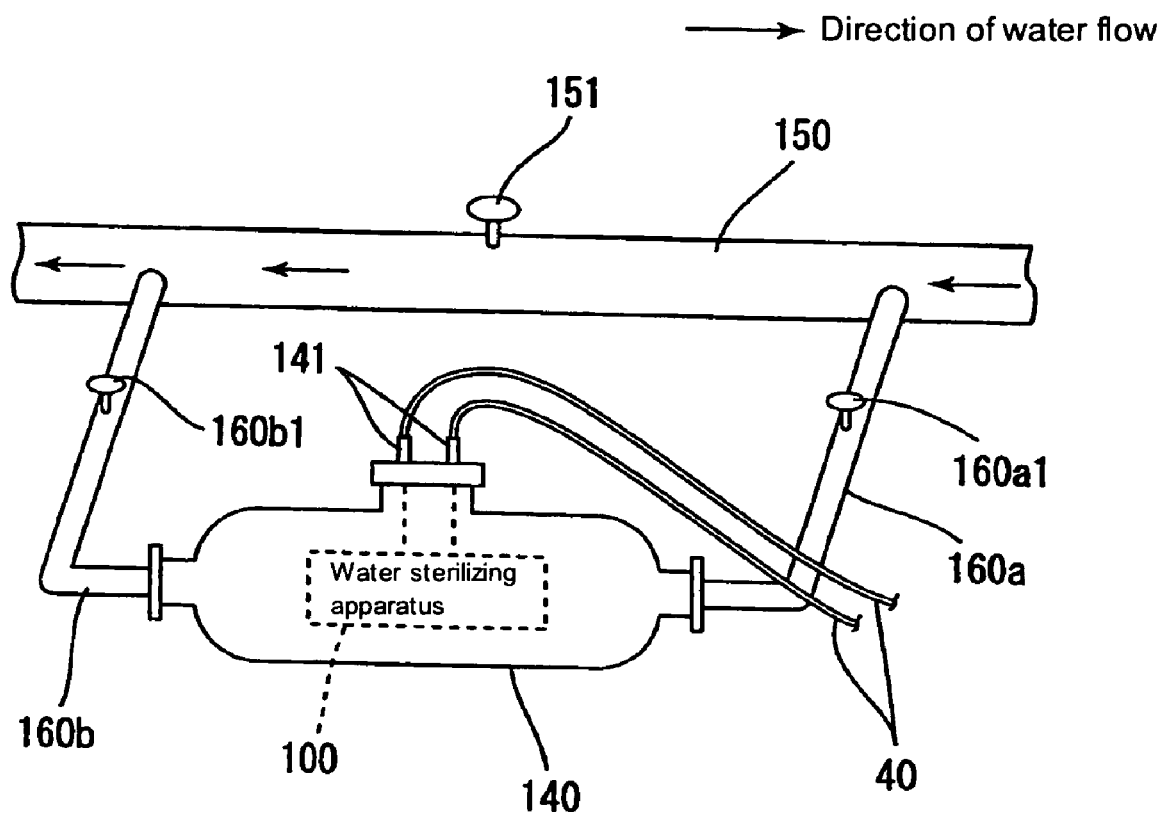
FIG. 9 is an exemplary illustration showing an example of how the water sterilizing apparatus is used.

FIG. 9 shows an example of using the water sterilizing apparatus 100.

In the figure, the cylinder 140 contains the components of the water sterilizing apparatus 100 excluding a rectifier 10, a switch 11 and a polarization switching circuit 20. The cylinder 140 is connected with branch pipes 160a and 160b, which are connected respectively with the main pipe 150. And the branch pipe 160a is connected with the inflow pipes 33a and 33b of the container 30 in the cylinder 140, and the branch pipe 160b is connected with the outflow pipes 34a and 34b of the container 30. A valve 151 is provided on the main pipe 150 between the positions where it is connected respectively with the branch pipes 160a and 160b, and valves 160a1 and 160b1 are respectively provided in the midway of the branch pipes 160a and 160b. Under such a structure, the stream flows in the main pipe 150 from the right to the left in the figure.

When all the valves 151, 160a1 and 160b1 are opened, a part of the stream flowing in the main pipe 150 passes through the branch pipe 160a and flows into the cylinder 140. The stream that flowed into the cylinder 140, in passing through the water sterilizing apparatus 100 inside, absorbs silver ions eluted from the silver ion eluting bodies 51a and flows out into the branch pipe 160b. The stream that has turned into a silver ion solution thus passes through the branch pipe 160b to return to the main pipe 150 and converges with the stream flowing in the main pipe 150. The concentration of silver ion in the stream that converged with the stream flowing from the branch pipe 160b can be varied by adjusting the opening of the valves 151, 160a1 and 160b1. In other words, an decreased opening of the valve 151 and an increased opening of the valves 160a1 and 160b1 results in an increased flow rate of the stream passing in the cylinder 140 and a higher concentration of silver ion in the stream flowing in the main pipe 150 that converged with the stream coming from the branch pipe 160b. On the other hand, an increased opening of the valve 151 and a decreased opening of the valves 160a1 and 160b1 results in a decreased flow rate of the stream passing through the cylinder 140, and a lower concentration of silver ions eluted in the stream flowing in the main pipe 150 having converged with the stream coming from the branch pipe 160b.

Of course, the valve 151 may be closed completely so that the stream flowing in the main pipe 150 may entirely pass through the cylinder 140.

As the main pipe 150 described above, piping for passing water installed in various facilities such as bath tub, swimming pool, hot spring resort facilities, water storage tank, vapor sterilizing apparatus, food processing plants and the like may be conceived. The installation of a cylinder 140 containing a water sterilizing apparatus 100 in the midway of such a piping enables to efficiently sterilize the water fed from the piping to the facilities mentioned above with silver ions. Incidentally, the conductive plates 35a and 35b are fed with DC voltage through connecting terminals 141 connected with the conductor 40. The polarity switching circuit 20 connected with the conductor 40 and the like are omitted in the figure.

The mode of using the water sterilizing apparatus 100 is not limited to the one shown in FIG. 9 above. For example, a sprayer may be provided with a water sterilizing apparatus 100.

In view of the rising interest in infectious diseases represented by the severe acute respiratory syndrome (SARS) these days, effective measures are required for sterilizing airports, hospitals and other public facilities. Accordingly, the provision of a water sterilizing apparatus 100 on each sprayer used for sterilizing buildings and facilities to spray atomized liquid having sterilization effect containing silver ion solution from the spray nozzle enables to sterilize efficiently public facilities and other buildings and facilities.

(2) Other Embodiments

We will describe below other examples of the container constituting the water sterilizing apparatus 100.

Figure 10:
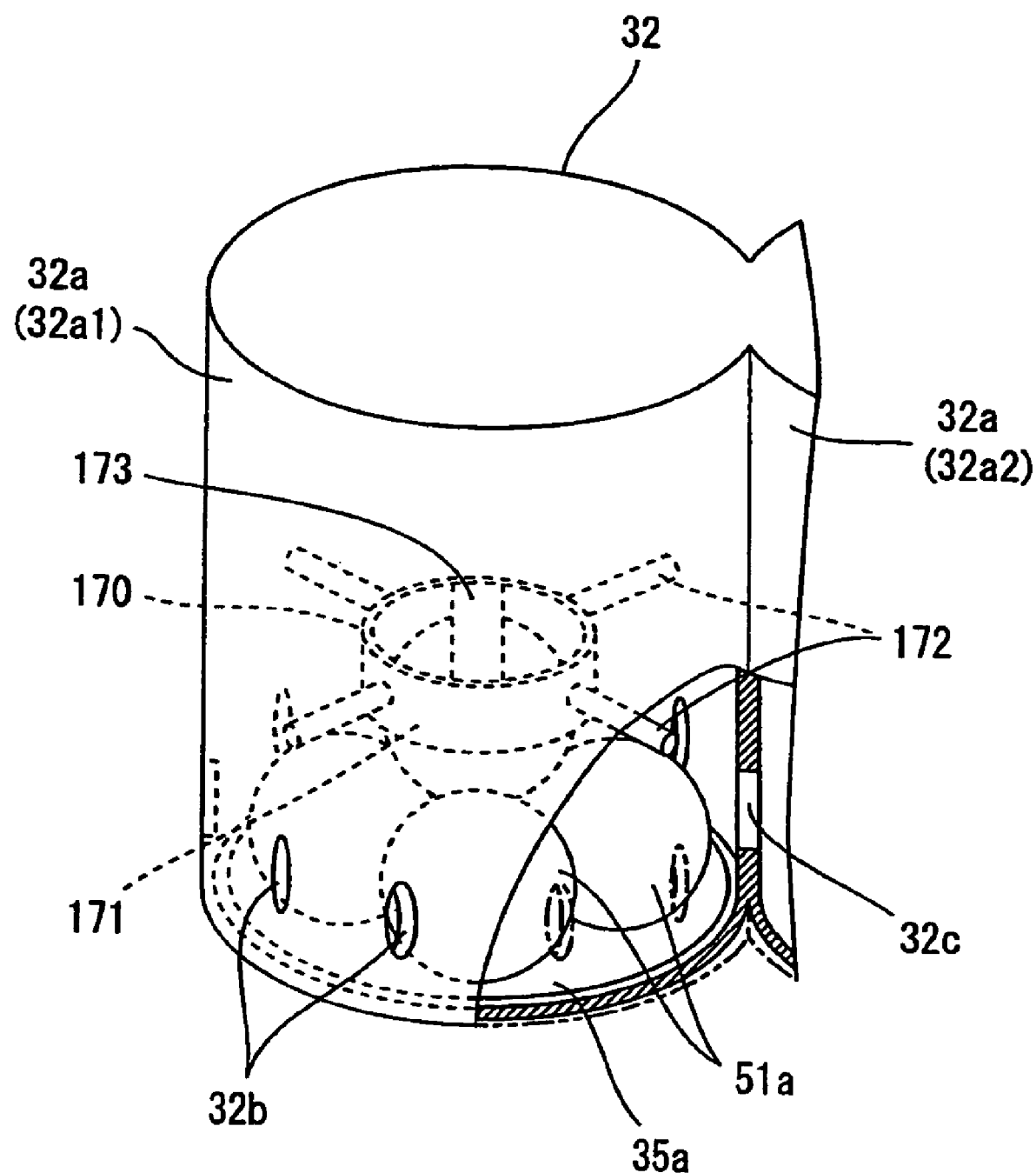
FIG. 10 is an exemplary illustration of a perspective view showing a part of the inner container provided with holders.

FIG. 10 is a perspective view showing a part of the internal container 32 having a holder 170 in each chamber of the electrolytic cell 32a. As the figure is identical to the first embodiment except that a holder 170 of the same structure is respectively provided in the first chamber 32a1 and the second chamber 32a2, we will describe all the components other than the holder 170 by allocating similar codes as the first embodiment. And the figure is drawn centered around the inside of the first chamber 32a1 among the whole of the internal container 32.

The holder 170 is composed of a tubular member 171 surrounding the periphery of the silver ion eluting body 51a placed at approximately the center being supported by the silver ion eluting bodies 51a placed directly on the bottom surface and positioned at the top among the silver ion eluting bodies 51a contained in the first chamber 32a1, a stay bar 172 for supporting in the air the tubular member 171 extending towards the inner wall of the first chamber 32a1 from the peripheral surface of the tubular member 171, and a tension plate 173 covering a part of the upper opening of the tubular member 171. The internal diameter of the tubular member 171 is designed to be somewhat larger than the diameter of the silver ion eluting body 51a. The top silver ion eluting body 51a surrounded by such a tubular member 171 can freely rotate by the agitating action of the stream within the limit of its surrounding. At the same time, even if it is strongly stirred by the stream, the top silver ion eluting body 51a does not slide far from its approximately central position supported by various silver ion eluting bodies 51a placed on the bottom surface.

And the tension plate 173 inhibits the top silver ion eluting body 51a from jumping out of the upper opening of the tubular member 171 when it is strongly agitated by the stream. The presence of such a holder 170 inhibits the top silver ion eluting body 51a from sliding far from the approximately central position supported by various silver ion eluting bodies 51a placed on the bottom surface and enables itself to play a role of a weight pressing various silver ion eluting bodies 51a placed on the bottom surface from above.

As a result, even while they are stirred by the stream, the silver ion eluting bodies 51a placed on the bottom surface can maintain their contact with the conductive plate 35a and stabilizes the silver ion elution effect by electrolysis.

Figure 11:
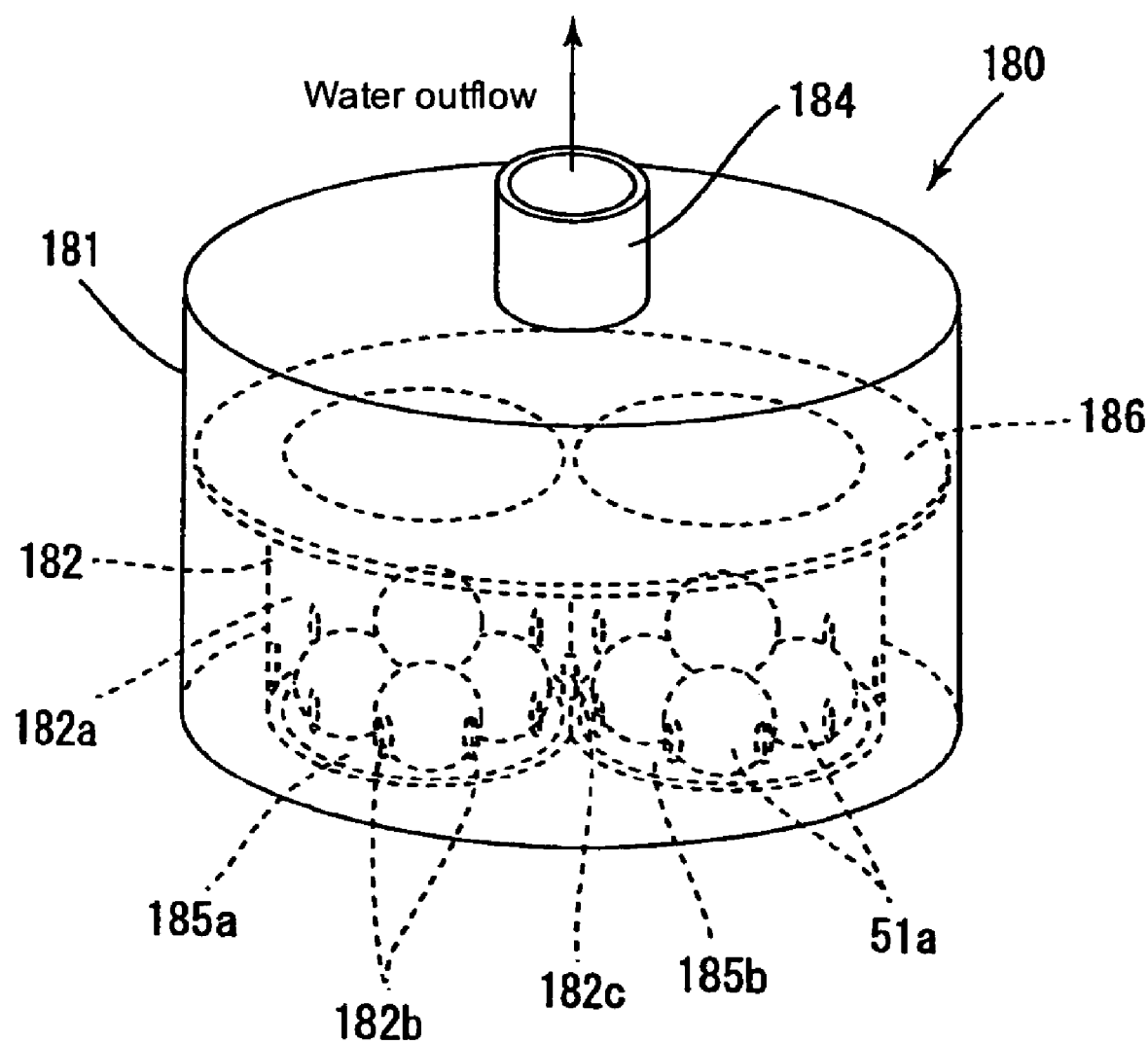
FIG. 11 is an exemplary illustration of a perspective view showing an example of the structure of container according to another embodiment.

FIG. 11 is a perspective view showing the structure of the container 180.

The container 180 is similar to the container 30 according to the first embodiment in that it includes an external container 181, an internal container 182 of a size capable of containing the whole in the external container 181, an inflow pipe, an outflow pipe 184, and a block plate 186. And it is similar to the container 30 described above in that the internal container 182 has an electrolytic cell 182a whose inside is divided into two chambers, a window 182c between the two chambers, each chamber includes either a conductive plate 185a or 185b and a plurality of through-holes 182b are formed on the side surface. However, the container 180 is different from the container 30 for the following points.

As shown in the figure, the height of the internal container 182 is limited by the position where the block plate 186 is fixed. The upper surface of the internal container 182 is not closed, and is open to the space enclosed by the upper surface of the block plate 186 and the inner wall of the external container 181 positioned above the block plate 186. And the outflow pipe 184 is connected not with the internal container 182 but with the external container 181. According to the structure, the stream that flowed into the first space from the inflow pipe not shown and connected with the external container 181 flows into the electrolytic cell 182a from the through-holes 182b of the internal container 182, circulates in the electrolytic cell 182a and stirs the silver ion eluting bodies 51a. Then, the stream flows into the space enclosed by the upper surface of the block plate 186 and the inner wall of the external container 181 positioned above the block plate 186 from the upper surface of the open internal container 182. And, while circulating in the space, the stream flows out from the outflow pipe 184 connected with the external container 181.

In other words, unlike the container 30, the container 180 is designed to make the stream circulate in the space within the external container 181 positioned above the block plate 186. The adoption of the structure enables to expand the space where the stream circulates. And in the case of securing the space for the circulation of the stream sufficient to cover the volume equivalent to that of the container 30 mentioned above, it will be possible to lower the height of the container 180, and to make the whole water sterilizing apparatus 100 compact. In addition, because the upper surface of the internal container 182 is not closed, it will be possible to contain more easily the silver ion eluting bodies 51a into the electrolytic cell 182a or to take out the same from the electrolytic cell 182a as compared with the container 30 mentioned above.

In the figure, the outflow pipe 184 extends approximately in the perpendicular direction from the upper surface of the external container 181. However, the position of disposing and the number of outflow pipes can be chosen freely.

Figure 12:
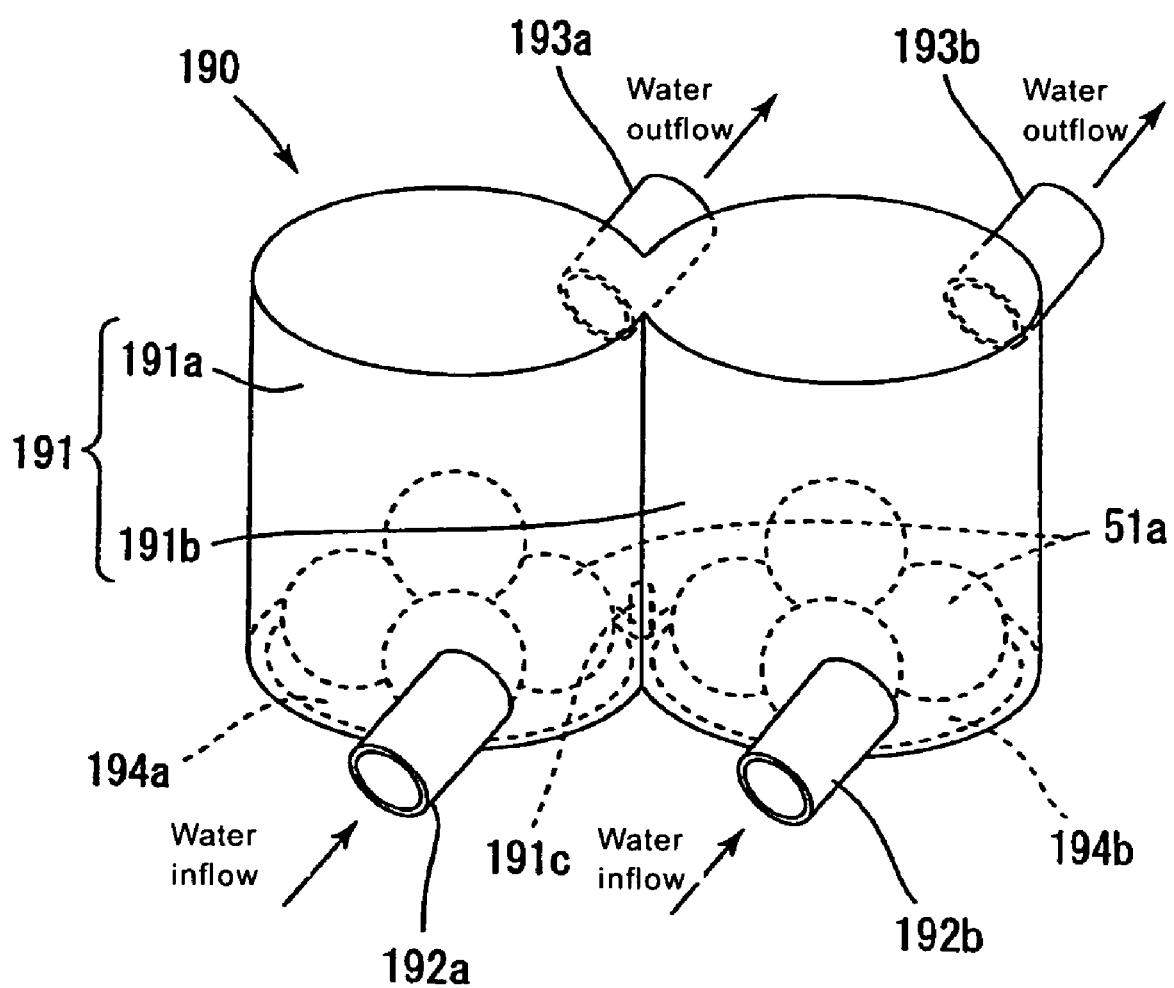
FIG. 12 is an exemplary illustration of a perspective view showing an example of the structure of container according to another embodiment.

FIG. 12 is a perspective view of the structure of a container 190.

In the figure, the container 190 is of a shape formed by joining together two sections of an approximately cylindrical container cut in the longitudinal sectional direction at a position near the side surface. The container 190 includes inside an electrolytic cell 191 divided into the first chamber 191a and the second chamber 191b, and is divided into the first chamber 191a and the second chamber 191b at a position where the approximately cylindrical containers overlap. Between the first chamber 191a and the second chamber 191b, a window 191c of a size through which no silver ion eluting body 51a can pass is formed. Thus, the two chambers are not completely separated. The first chamber 191a and the second chamber 191b are respectively provided with a conductive plate 194a or 194b connected respectively with a polarity switching circuit not shown and the like.

Unlike the container 30 or the container 180, the container 190 is not divided into the internal container and the external container, and has neither block plate nor through-holes. The inflow pipes 192a and 192b are connected with the positions corresponding to the first chamber 191a and the second chamber 191b in the lower side surface of the container 190 to enable the stream to flow directly into the first chamber 191a and the second chamber 191b. And outflow pipes 193a and 193b are connected with the positions corresponding respectively to the first chamber 191a and to the second chamber 191b in the upper side surface of the container 190 to enable the stream to flow directly out of the first chamber 191a and the second chamber 191b.

The stream flows directly into each chamber from the inflow pipes 192a and 192b, stirs the silver ion eluting bodies 51a while circulating in each chamber. And the stream circulating in each chamber flows out from the outflow pipes 193a and 193b.

Thus, the container 190 has a very simple structure as compared with the container 30 or the container 180 mentioned above. Therefore, it is easy to produce the container 190 as compared with the case of producing the container 30 or the container 180, and the production cost can be limited so much lower.

Figure 13:
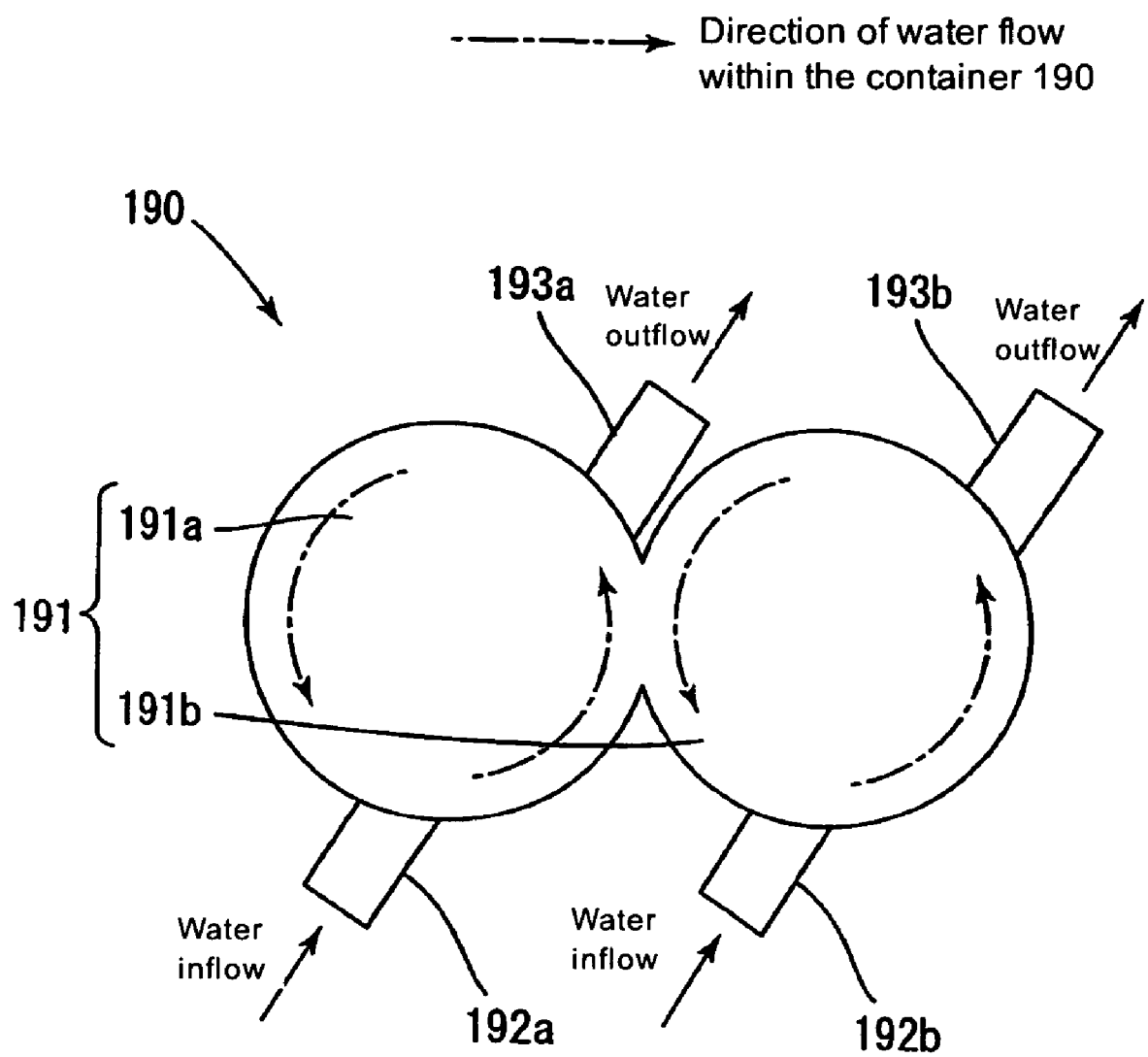
FIG. 13 is an exemplary illustration of a top plan view of the container shown in FIG. 12.

FIG. 13 is a top plan view of the container 190.

As shown in the figure, the inflow pipe 192a and the outflow pipe 193a are disposed in the direction not passing through the center of axis of the first chamber 191a of the electrolytic cell 191 on the side surface of the container 190 and the inflow pipe 192b and the outflow pipe 193b are disposed in the direction not passing through the center of axis of the second chamber 191b likewise. The disposition of the inflow pipes 192a and 192b and the outflow pipes 193a and 193b as described above results in the circulation of the stream having flowed in from the inflow pipes 192a and 192b respectively in the first chamber 191a and the second chamber 191b by rotating centered around the center of axis of each chamber. And at the time of outflow, the stream can flow out smoothly respectively from the outflow pipes 193a and 193b along the rotation direction. Therefore, the silver ion eluting bodies 51a contained in the electrolytic cell 191 will be efficiently agitated in each chamber, and the action of contact with the stream and the mutual frictional movements will be sufficient.

It should be borne in mind, however, that the above mode of disposing the inflow pipes 192a and 192b and the outflow pipes 193a and 193b is only an example, and they can be disposed in all directions on the side surface, the upper surface and the lower surface of the container 190.

Figure 14:
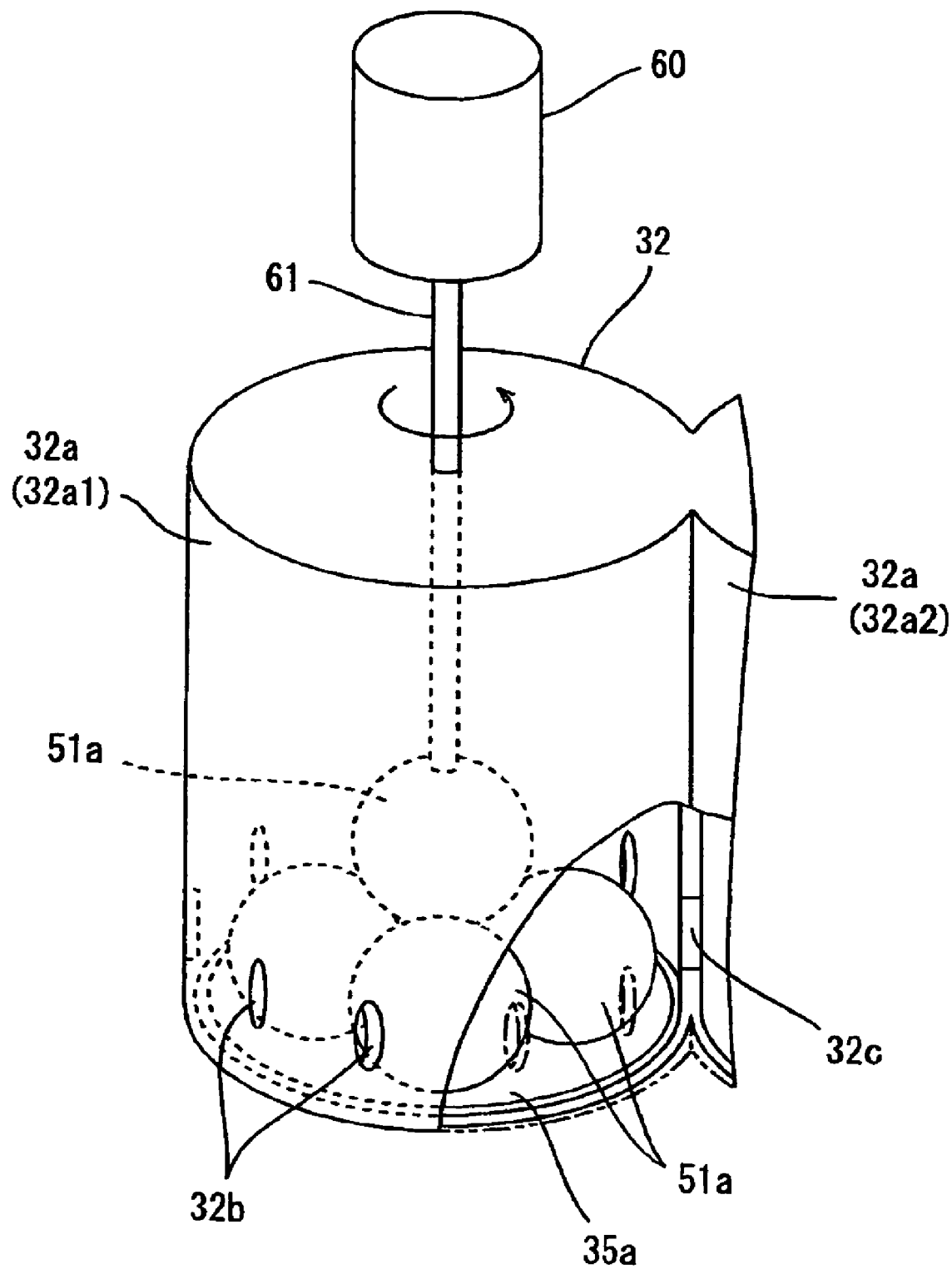
FIG. 14 is an exemplary illustration of a perspective view showing a part of the inner container containing silver ion eluting bodies connected with a motor.

FIG. 14 is a perspective view showing, like FIG. 10, a part of the internal container 32 when a predetermined silver ion eluting body 51a of the electrolytic cell 32a is linked with a motor 60 (corresponding to the driving unit in the claim). The figure shows a structure similar to that of the first embodiment except that a silver ion eluting body 51a and the motor 60 are linked by the same structure respectively in the first chamber 32a1 and the second chamber 32a2. The figure describes mainly the inside of the first chamber 32a1 from the internal chamber 32.

The motor 60 is fed with power from the power source omitted in the figure, generates rotational power to rotate the linking member 61 constituting a rotational shaft. Various types of motor including DC motor, AC motor and the like can be used for the motor 60. In the figure, the top-position silver ion eluting body 51a located at the approximately central position being supported by various silver ion eluting bodies placed directly on the bottom surface among various silver ion eluting bodies 51*a* contained being stacked up in the first chamber 32*a*1 and the link member 61 are linked. The link member 61 links at a position where the approximately center of axis of the silver ion eluting bodies 51*a* passes in relation to the top silver ion eluting body 51*a*. The position of installing the motor 60 is not limited. However, it can be installed for example on the outside of the upper surface of the container 30. Incidentally, the outflow pipe 34*a* not shown may be installed at any proper position different from the motor 60 and the link member 61.

When, in the structure described above, the motor 60 is started and the top silver ion eluting body 51*a* is rotated together with the link member 61, the lower silver ion eluting bodies 51*a* in contact with the top silver ion eluting body 51*a* subjected to the frictional force transmitted by the top silver ion eluting body 51*a* rotate in various directions. In other words, various silver ion eluting bodies 51*a* placed on the bottom surface, coming into contact with the rotating top silver ion eluting body 51*a*, in addition to the agitation action of the stream, can more effectively rotate, move in the chamber and be rotated. As a result, each silver ion eluting body 51*a* can thoroughly rub the surface of each other and therefore the effect of removing scale and the like can be further improved and the elution effect of silver ion can be maintained at a high level. Moreover, the contact action between the silver ion eluting body 51*a* and water will be further enhanced. Finally, as the position of the top silver ion eluting body 51*a* is more or less fixed by linking with the link member 61, it can play the role of restraining various silver ion eluting bodies 51*a* placed on the bottom surface from lifting up from the bottom surface while they are moving. As a result, various silver ion eluting bodies 51*a* placed on the bottom surface are maintained in the state of being in contact with the conductive plate 35*a*, and the elution effect of silver ions by electrolysis stabilizes.

It is needless to say that the structure of rotating a predetermined silver ion eluting body 51*a* by means of the motor 60 is applicable even when the aforementioned containers 180 and 190 are used. Although the foregoing description mentioned that the link shaft 61 is to be linked with the top silver ion eluting body 51*a*, it is not always necessary to link directly both of them, and other members may be used to intervene between them. A variety of structures can be adopted as long as the structure is composed of transmitting the rotational power of the motor 60 to the silver ion eluting bodies 51*a* and causing their rotation.

And the use of the motor 60 enables to efficiently elute silver ions in the water without stirring the silver ion eluting bodies 51*a* with the stream of water.

Figure 15:
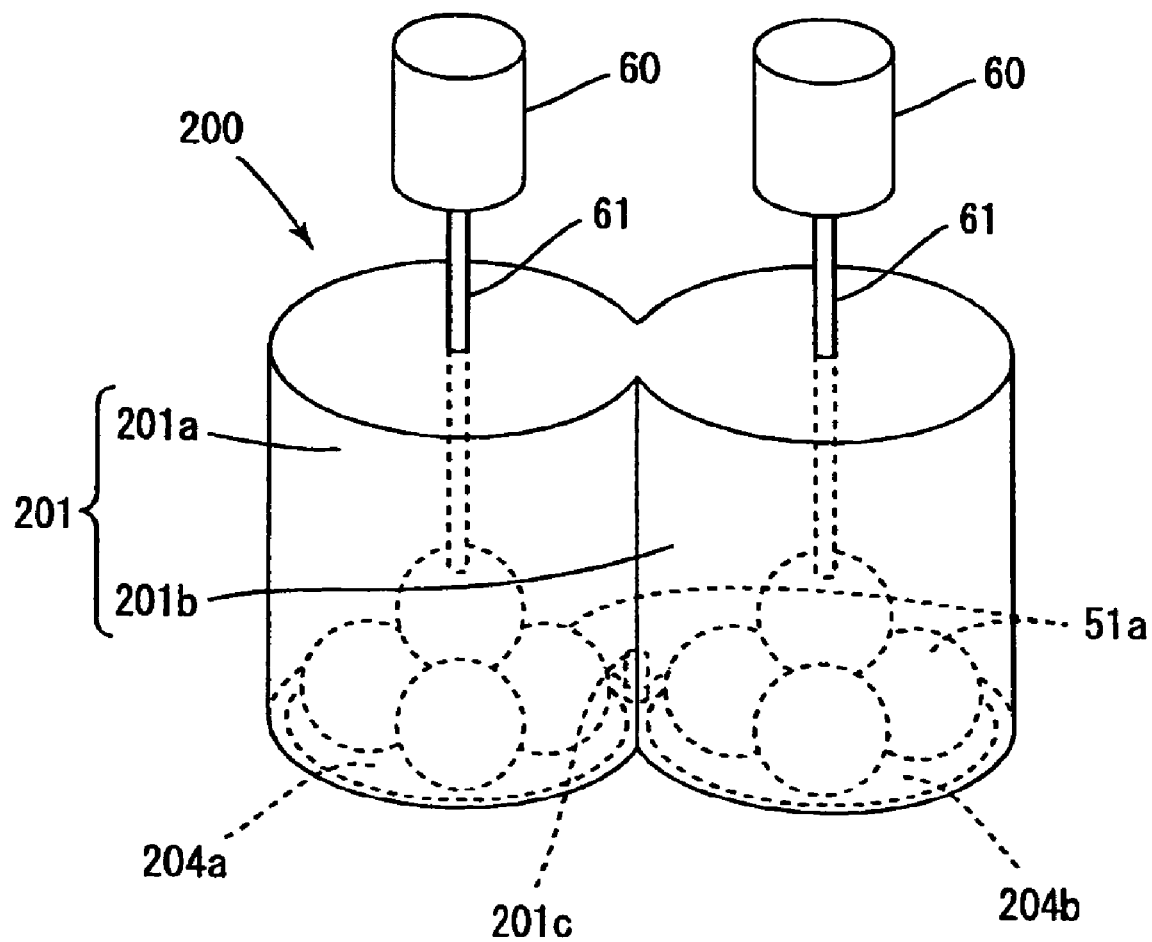
FIG. 15 is an exemplary illustration of a perspective view showing an example of the structure of the container containing silver ion eluting bodies connected with a motor.

FIG. 15 shows another example from that of FIG. 14 based on the structure of rotating the predetermined silver ion eluting bodies 51*a* by means of the motor 60. The container 200 has a shape formed by joining the sections obtained by cutting off in the longitudinal sectional direction near the side surface of two approximately cylindrical containers. It is similar to the container 190 in that it includes inside an electrolytic cell 201 divided into the first chamber 201*a* and the second chamber 201*b*, a window 201*c* of a size too small for the silver ion eluting bodies 51*a* to pass through is formed between the two chambers, the first chamber 201*a* and the second chamber 201*b* respectively includes a conductive plate 204*a* or 204*b*, and the conductive plates 204*a* and 204*b* are connected with a polarity switching circuit not shown and the like. However, the container 200 is not designed to make the water flow from the inflow pipe through the container to the outflow pipe. The electrolytic cell 201 in the container 200 stores a predetermined amount of water to be sterilized having flowed in from the inflow gate not shown and formed on the upper surface of the container. And the top silver ion eluting body 51*a* among the silver ion eluting bodies 51*a* stacked in each chamber is, as in FIG. 14, linked with the motor 60 through a link member 61.

In other words, as the figure shows, even when a container that cannot generate streams to stir the silver ion eluting bodies 51*a* by its structure, the rotation of the top silver ion eluting body 51*a* caused by the motor 60 and resulting in the rotation of the lower silver ion eluting bodies 51*a* will enable to remove scale on the surface of the silver ion eluting bodies 51*a* and to elute efficiently silver ions in the water by the electrolysis effect and the contact effect with the water. As a result, when the motor is operated for a predetermined period of time and a desired amount of silver ion has eluted in the water, the process water can be taken out from the container 200 to be used as the water for bath or a swimming pool, and the process water can be used for sterilizing various facilities, equipment and foods.

We have described so far by using the silver ion eluting body 51 for the metal ion eluting body 50. However, the metal ion eluting body 50 is not limited to the silver ion eluting body 51, and the copper ion eluting body can be used for sterilization processing.

In other words, if copper ion eluting bodies are contained in the electrolytic cell in the place of silver ion eluting bodies in each of the above embodiments, the copper ion eluting bodies elute copper ions in the water by the contact action with the stream and electrolysis. And copper ion eluate into which copper ion has eluted flows out from the outflow pipes 34*a*, 34*b* and the like.

And the repetition of mutual frictional movements among the copper ion eluting bodies results in the removal of attachments such as scale on the surface. Therefore, it is possible to prevent any decline in the elution effect of copper ions by the attachments also by using copper ion eluting bodies over an extended period of time.

As for the shape of copper ion eluting body, as in the case of silver ion eluting body 51, it is possible to adopt a variety of shapes including spherical shape or cylindrical shape shown in FIGS. 2 and 3.

We will now explain on the effect of copper ion.

Generally, silver ion is known to have strong sterilizing effect, and it has a sterilizing effect for *Legionella, Salmonella, staphylococcus*, and other various pathogenic bacteria. Copper ion in particular is known to have a strong alga-cidal effect. Copper ion adsorbs algae and cause their death, and works to restrain the development and proliferation of algae. As *Legionella* proliferates by living together with algae and ameba, it is possible to control the proliferation of *Legionella* in the water by sterilizing water by using highly alga-cidal copper ion.

And as copper ion is has a lower sterilizing effect than the silver ion mentioned above, it will be possible to purify water by taking advantage of the purifying capacity of useful bacteria without causing their death in the water.

Copper ion eluate produces neither irritating odor due to chloric chemicals, nor foul odor, does not cause chapped skin and is harmless for the human body. Therefore, copper ion is suitable for sterilizing water in bath tubs, swimming pools, hot spring resort facilities, water storage tanks, steam sterilizing apparatuses, and food processing plant and other facilities.

And, as copper ion causes no corrosion of piping, machinery and equipment, other construction materials, sash and the like, the deterioration of apparatuses used for water sterilization barely advances.

And if a water sterilizing apparatus 100 containing silver ion eluting bodies 51 and a water sterilizing apparatus 100 containing copper ion eluting bodies are installed on the piping of the facilities mentioned above, ion solution containing silver ion and copper ion can be produced by the facilities mentioned above, and it will be possible to sterilize water by taking advantage of the sterilizing effect that silver ion and the copper ion have respectively The metal ion eluting bodies 50 contained in the water sterilizing apparatus 100 are not limited to the silver ion eluting body 51 and the copper ion eluting body mentioned above, and include the metal ion eluting bodies 50 that elute various metal ions having sterilizing effect and anti-corrosion effect.

(3) Conclusion

Thus, the adoption of the silver ion eluting bodies 51a and the like stirred by the stream in each chamber of the electrolytic cell 32a as the positive poles in a chamber and as the negative poles in another chamber results in an efficient elution of silver ions and the like in the water due to the electrolytic action and the contact action between the silver ion eluting bodies 51a and the like and the stream of water. And the stirred silver ion eluting bodies 51a and the like remove attachments on their surface by their mutual frictional movements, and prevent any decline in the elution effect of silver ions and the like. Therefore, it will be possible to produce stably silver ion eluate having a high sterilizing effect over a long period of time.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

What is claimed is:

1. A water sterilizing apparatus comprising;
a container provided with an electrolytic cell composed of two substantially separate chambers with limited communications therebetween;
inflow pipes and outflow pipes connected with the container;
the container comprises external container coupled with at least one inflow pipe and an internal container in which a plurality of through-holes penetrating to the electrolytic cell are formed on side surface of the internal container and are coupled with at least one outflow pipe:
a voltage feeding unit that is connected with a conductor composed of a conductive member provided in each chamber of the electrolytic cell and that feeds the conductor with DC voltage; and
a plurality of metal ion eluting bodies that are respectively contained in each chamber of the electrolytic cell and that elute metal ions by continued mutual frictional movements among the metal ion eluting bodies due to an agitating action of a stream of water and by electrolysis caused between positive poles resulting from their contact with a conductor connected with a positive side of the voltage feeding unit in a chamber and negative poles resulting from their contact with a conductor connected with a negative side of the voltage feeding unit in another chamber.

2. The water sterilizing apparatus according to claim 1, wherein
the metal ion eluting body is cylindrical.

3. The water sterilizing apparatus according to claim 1, wherein
the metal ion eluting body is spherical.

4. The water sterilizing apparatus according to claim 1, wherein
the metal ion eluting body is hollow inside.

5. The water sterilizing apparatus according to claim 1, wherein
the inflow pipes and the outflow pipes are disposed at different heights.

6. The water sterilizing apparatus according to claim 1, wherein
the inflow pipes and the outflow pipes are disposed in a direction deviated by a predetermined angle from a direction perpendicular to a center of axis of each chamber of the electrolytic cell on a side surface of the container.

7. The water sterilizing apparatus according to claim 1, wherein
the outflow pipes are disposed on an upper surface or a lower surface of the container.

8. The water sterilizing apparatus according to claim 1, wherein
the outflow pipes are disposed at an approximately perpendicular direction on the upper surface of the container.

9. The water sterilizing apparatus according to claim 1, wherein
the inflow pipe comprises a straightening vane for maintaining, a predetermined direction of a stream flowing in, at the inflow gate in contact with the container.

10. The water sterilizing apparatus according to claim 1, wherein
the inflow pipe and the outflow pipe are disposed in each chamber of the electrolytic cell.

11. The water sterilizing apparatus according to claim 1, wherein
the inner wall of each chamber of the electrolytic cell is approximately cylindrical.

12. The water sterilizing apparatus according to claim 1, wherein
the conductor is disposed at a bottom surface of each chamber of the electrolytic cell with one surface exposed to an inside of each chamber.

13. The water sterilizing apparatus according to claim 1, wherein
the electrolytic cell includes a holder for holding the metal ion eluting body positioned at a top level being placed on other metal ion eluting bodies among the metal ion eluting bodies contained in each chamber freely rotatably by limiting a scope of its movement to a predetermined extent within each chamber.

14. The water sterilizing apparatus according to claim 1 wherein
the voltage feeding unit comprises a polarity switching circuit capable of switching the polarity of the DC voltage to be fed to the conductor.

15. The water sterilizing apparatus according to claim 1, wherein
a predetermined metal ion eluting body among the metal ion eluting bodies contained in each chamber rotates by the rotational power generated by a predetermined driving unit and transmitted by a predetermined member and other metal ion eluting bodies contained in same chamber of the electrolytic cell as the rotating predetermined metal ion eluting body rotate by entering in contact with the rotating predetermined metal ion eluting body.

16. The water sterilizing apparatus according to claim 15, wherein the metal ion eluting body positioned at a top level being placed on other metal ion eluting bodies among the metal ion eluting bodies contained in each chamber is linked with a member rotating by rotational power generated by the driving unit.

17. A water sterilizing apparatus comprising:

a container provided with an electrolytic cell composed of two substantially separate chambers with limited communications between them;

a voltage feeding unit connected with a conductor composed of a conductive member provided in each chamber of the electrolytic cell for feeding the conductor with DC voltage;

a plurality of metal ion eluting bodies respectively contained in each chamber of the electrolytic cell, wherein a predetermined metal ion eluting body among the metal ion eluting bodies contained in each chamber rotates by the rotational power generated by a predetermined driving unit and transmitted by a predetermined member the other metal ion eluting bodies contained in the same chamber of the electrolytic cell as the rotating predetermined metal ion eluting body rotate by entering into contact with the rotating predetermined metal ion eluting body and wherein the metal ion eluting bodies turn into positive poles by entering into contact with a conductor connected with a positive side of the voltage feeding unit in a chamber and turn into negative poles by entering into contact with a conductor connected with the negative side of the voltage feeding unit in another chamber, causing thus electrolysis, and eluting metal ions in the water contained in the electrolytic cell.

* * * * *